(12) United States Patent
Phillips et al.

(10) Patent No.: US 6,849,343 B2
(45) Date of Patent: Feb. 1, 2005

(54) TITANIUM-CONTAINING INTERFERENCE PIGMENTS AND FOILS WITH COLOR SHIFTING PROPERTIES

(75) Inventors: Roger W. Phillips, Santa Rosa, CA (US); Charlotte R. LeGallee, Healdsburg, CA (US); Paul T. Kohlmann, Windsor, CA (US); Vladimir Raksha, Santa Rosa, CA (US); Alberto Argoitia, Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

(21) Appl. No.: 10/413,091

(22) Filed: Apr. 14, 2003

(65) Prior Publication Data

US 2003/0203222 A1 Oct. 30, 2003

Related U.S. Application Data

(62) Division of application No. 09/685,468, filed on Oct. 10, 2000, now Pat. No. 6,569,529.

(51) Int. Cl.$^7$ .............................................. B32B 15/04
(52) U.S. Cl. ........................ 428/629; 428/403; 428/212; 428/633; 428/469; 428/699; 428/701; 428/702
(58) Field of Search ................................. 428/403, 212, 428/336, 548, 552, 629, 633, 469, 471, 472, 472.2, 689, 699, 701, 702; 106/403, 436

(56) References Cited

U.S. PATENT DOCUMENTS

| | | |
|---|---|---|
| 3,011,382 A | 12/1961 | Sylvester et al. |
| 3,123,490 A | 3/1964 | Bolomey et al. |
| 3,412,575 A | 11/1968 | Feldman et al. |

(List continued on next page.)

FOREIGN PATENT DOCUMENTS

| | | |
|---|---|---|
| EP | 353544 | 7/1990 |
| EP | 395410 | 10/1990 |
| EP | 686675 | 12/1996 |

(List continued on next page.)

OTHER PUBLICATIONS

Zink, et al, "Optical Probes and Properties of Aluminoxilicate Glasses Prepared by the Sol–Gel Method, " Polmer material Science and Engineering, 61, pp. 204–208 (1989).

J.A. Dobrowolski, K.M. Baird, P.D. Carman and A. Waldorf, "Optical Interference Coatings for inhibiting of Counterfeiting," Optica Acta, 1973, vol. 20. 12, pp. 925–937.

(List continued on next page.)

*Primary Examiner*—Deborah Jones
*Assistant Examiner*—G. Blackwell-Rudasill
(74) *Attorney, Agent, or Firm*—Allen, Dyer, Doppelt, Milbrath & Gilchrist, P.A.

(57) ABSTRACT

Interference pigment flakes and foils are provided which have color shifting properties. The pigment flakes can have a symmetrical coating structure on opposing sides of a reflector layer, can have an asymmetrical coating structure with all of the layers on one side of the reflector layer, or can be formed with encapsulating coatings around a core reflector layer. The coating structure of the flakes and foils includes a reflector layer, a dielectric layer on the reflector layer, and a titanium-containing absorber layer on the dielectric layer. The pigment flakes and foils exhibit a discrete color shift so as to have a first color at a first angle of incident light or viewing and a second color different from the first color at a second angle of incident light or viewing. The pigment flakes can be interspersed into liquid media such as paints or inks to produce colorant compositions for subsequent application to objects or papers. The foils can be laminated to various objects or can be formed on a carrier substrate.

16 Claims, 10 Drawing Sheets

U.S. PATENT DOCUMENTS

| | | | |
|---|---|---|---|
| 3,622,473 A | 11/1971 | Ohta et al. | |
| 3,858,977 A | 1/1975 | Baird et al. | |
| 3,926,659 A | 12/1975 | Bernhard et al. | |
| 3,949,139 A | 4/1976 | Dunning et al. | |
| 3,962,397 A | 6/1976 | Narui et al. | |
| 3,988,494 A | 10/1976 | McAdow | |
| 4,116,710 A | 9/1978 | Heikel | |
| 4,168,983 A | 9/1979 | Vittands et al. | |
| 4,213,886 A | 7/1980 | Turner | |
| 4,309,075 A | 1/1982 | Apfel et al. | |
| 4,321,087 A | 3/1982 | Levine et al. | |
| 4,434,010 A | 2/1984 | Ash | |
| 4,552,593 A | 11/1985 | Ostertag | |
| 4,623,396 A | 11/1986 | Kimura et al. | |
| 4,629,512 A | 12/1986 | Kondis | |
| 4,705,300 A | 11/1987 | Berning et al. | |
| 4,705,356 A | 11/1987 | Berning et al. | |
| 4,721,217 A | 1/1988 | Phillips et al. | |
| 4,756,771 A | 7/1988 | Brodalla et al. | |
| 4,838,648 A | 6/1989 | Phillips et al. | |
| 4,940,523 A | 7/1990 | Takeshima | |
| 4,978,394 A | 12/1990 | Ostertag et al. | |
| 5,009,486 A | 4/1991 | Dobrowolski et al. | |
| 5,059,245 A | 10/1991 | Phillips et al. | |
| 5,084,351 A | 1/1992 | Phillips et al. | |
| 5,116,664 A | 5/1992 | Kimura et al. | |
| 5,135,812 A | 8/1992 | Phillips et al. | |
| 5,171,363 A | 12/1992 | Phillips et al. | |
| 5,190,807 A | 3/1993 | Kimock et al. | |
| 5,198,042 A | 3/1993 | Masumoto et al. | |
| 5,214,530 A | 5/1993 | Coombs et al. | |
| 5,225,057 A | 7/1993 | LeFebvre et al. | |
| 5,278,590 A | 1/1994 | Phillips et al. | |
| 5,279,657 A | 1/1994 | Phillips et al. | |
| 5,332,767 A | 7/1994 | Reisser et al. | |
| 5,356,471 A | 10/1994 | Reynders | |
| 5,364,467 A | 11/1994 | Schmid et al. | |
| 5,378,527 A | 1/1995 | Nakanishie et al. | |
| 5,549,774 A | 8/1996 | Miekka et al. | |
| 5,571,624 A | 11/1996 | Phillips et al. | |
| 5,573,584 A | 11/1996 | Ostertag et al. | |
| 5,587,207 A | 12/1996 | Gorokhovsky | |
| 5,593,773 A | 1/1997 | McKay et al. | |
| 5,607,504 A | 3/1997 | Schmid et al. | |
| 5,624,076 A | 4/1997 | Miekka et al. | |
| 5,624,486 A | 4/1997 | Schmid et al. | |
| 5,627,410 A | 5/1997 | Miekka et al. | |
| 5,629,068 A | 5/1997 | Miekka et al. | |
| 5,648,165 A | 7/1997 | Phillips et al. | |
| 5,763,086 A | 6/1998 | Schmid et al. | |
| 5,766,334 A | 6/1998 | Hashizume et al. | |
| 5,766,335 A | 6/1998 | Bujard et al. | |
| 5,790,304 A | 8/1998 | Sanders et al. | |
| 5,830,567 A | 11/1998 | Panush | |
| 5,858,078 A | 1/1999 | Andes et al. | |
| 5,877,895 A | 3/1999 | Shaw et al. | |
| 6,013,370 A | 1/2000 | Coulter et al. | |
| 6,150,022 A * | 11/2000 | Coulter et al. | 428/403 |
| 6,157,489 A * | 12/2000 | Bradley et al. | 359/584 |
| 6,399,228 B1 * | 6/2002 | Simpson | 428/699 |
| 6,586,098 B1 * | 7/2003 | Coulter et al. | 428/403 |
| 6,686,042 B1 * | 2/2004 | LeGallee | 428/403 |

FOREIGN PATENT DOCUMENTS

| | | |
|---|---|---|
| EP | 984043 | 3/2000 |
| JP | 56-130469 | 10/1982 |
| JP | 10-147065 | 6/1989 |
| WO | WO 96/22336 | 7/1996 |
| WO | WO 96/38505 | 12/1996 |
| WO | WO 00/31571 | 6/2000 |
| WO | WO 00/34395 | 6/2000 |
| WO | WO 00/43457 | 7/2000 |
| WO | WO 01/18127 | 3/2001 |

OTHER PUBLICATIONS

John M. McKieman, et al, "*Luminescence and Laser Action of Coumarin Dyes Doped in Silicate and Aluminosilicate Glasses Prepared by the Sol–Gel Technique*," Journal of Inorganic and Organometallic Polymers, vol. 1, No. 1, 87–103, 1991.

The Mearl Corporation brochure for "*Mearl Iridescent Film*," Peekskill, New York.

CHROMAFLAIR Light Interference Pigments, Technical Bulletin No. 2, "*Dynamic Color Area Diagram and Value*," TB–02–98.

B. Window, F. Sharples, and N. Savvides, "*Magnetically Confined Sputter Source with High Ion Flux*," J. . Vac. Sci. Technol. A 3(6), Nov./Dec. 1985, p. 2368–2372.

N. Savvides and B. Window, "*Unbalanced Magnetron Ion–Assisted Deposition and Property Modification of Thin Films*," J. Vac. Sci. Technol. A 4(3), May/Jun. 1986, p. 504–508.

Minolta Manual for "*Precise Color Communication, Color Control From Feeling to Instrumentation*," pp. 18, 20, 22, 23, 46, 47, 48 and 49.

Greiwe K., *Coloured Aluminum Pigments*, Eckart–Werke, Werk Güntersthal, $4^{th}$ Nümberg Congress, Paper 6, 1–7.

Callister WD, Jr., *Material Science and Engineering: An Introduction*, John Wiley & Sons, Inc., 91–112, 1985.

Barrett and Nix, *The Principles of Engineering Materials*, Prentice–Hall, Inc., 282–290, 1973.

Deborah W. Seigmann, Charles E. Carraher, Jr., and Dora Brenner, "*Platinum II Polyamines: Determination of Size by Sephacryl Column Chromatography*," Department of Chemistry, Florida Atlantic University, Boc Raton, Florida, 1987.

"*Sol–Gel Processing*," http://faculty.washington.edu/gzcao/group/solgel.htm, Aug. 15, 2000.

FEW's Sol–Gel Technology, "*Sol–Gel Technology*," http://www.few.de/en/sol–gel.stm, Aug. 15, 2000.

Phalippou, Jen, "*Sol–Gel: A Low Temperature Process for the Materials of the New Millenium*," The Sol–Gel Gateway, http://www.solgel.com/articles/June00/phalip/introsolgel.htm, Aug. 15, 2000.

* cited by examiner

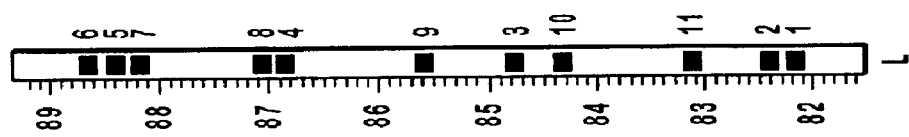
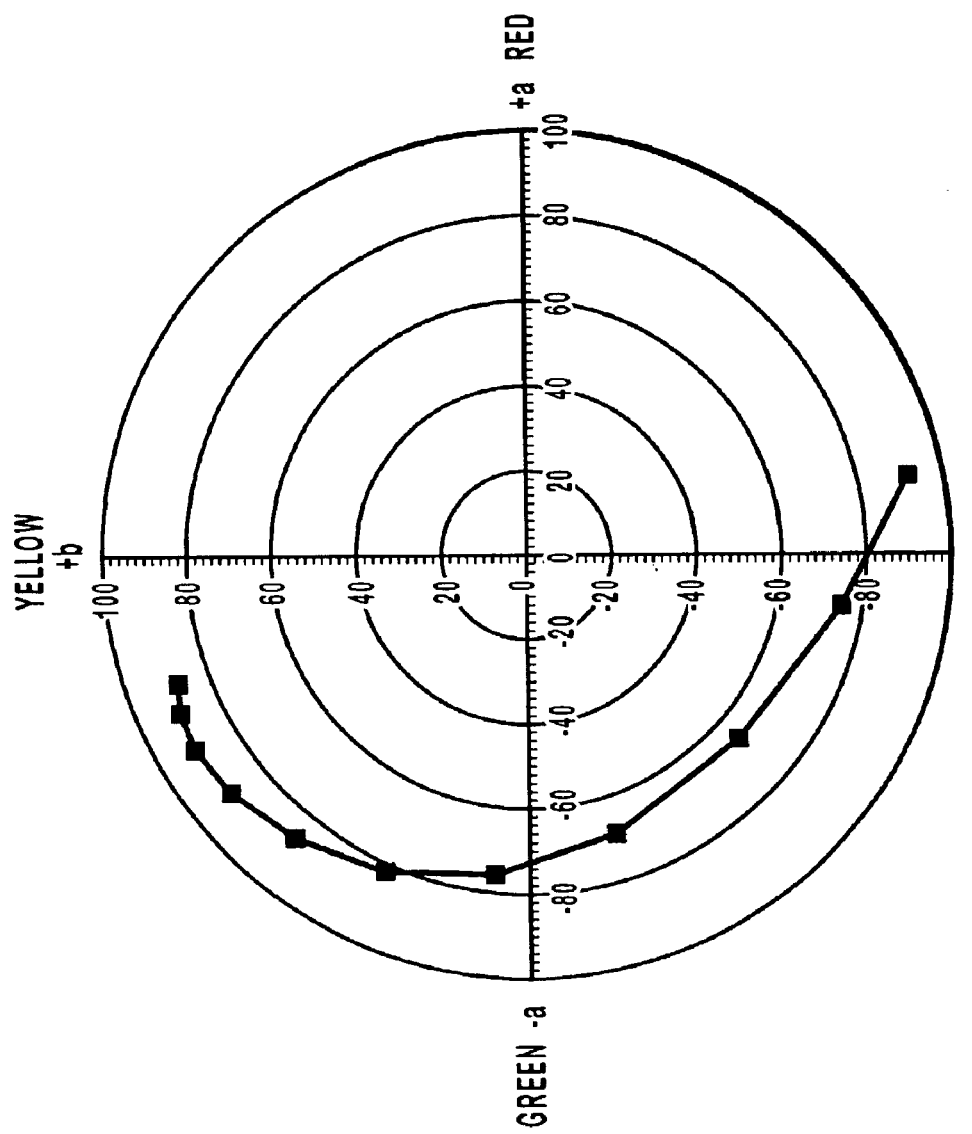
Fig. 19B
Fig. 19A

TITANIUM-CONTAINING INTERFERENCE PIGMENTS AND FOILS WITH COLOR SHIFTING PROPERTIES

CROSS-REFERENCE TO RELATED

This application is a divisional of U.S. patent application Ser. No. 09/685,468, filed Oct. 10, 2000 now U.S. Pat. No. 6,569,529, and entitled "Titanium-Containing Interference Pigments And Foils With Color Shifting Properties" and claims the benefit thereof.

BACKGROUND OF THE INVENTION

1. Field of the Invention

The present invention relates generally to interference pigments and foils. More particularly, the present invention relates to multilayer color shifting pigment flakes and foils which have titanium-containing absorber layers.

2. Background Technology

Various color shifting pigments, colorants, and foils have been developed for a wide variety of applications. For example, color shifting pigments have been used in applications such as cosmetics, inks, coating materials, ornaments, ceramics, automobile paints, anti-counterfeiting hot stamps and anti-counterfeiting inks for security documents and currency. Such pigments, colorants, and foils exhibit the property of changing color upon variation of the angle of incident light, or as the viewing angle of the observer is shifted.

The color shifting properties of the pigments and foils can be controlled through proper design of the optical thin films used to form the flake or foil coating structure. Desired effects can be achieved through the variation of parameters such as thickness of the layers forming the flakes and foils and the index of refraction of each layer. The changes in perceived color which occur for different viewing angles or angles of incident light are a result of a combination of selective absorption of the materials comprising the layers and wavelength dependent interference effects. The interference effects, which arise from the superposition of light waves that have undergone multiple reflections, are responsible for the shifts in color perceived with different angles. The reflection maxima changes in position and intensity, as the viewing angle changes, due to the absorption characteristics of a material which are selectively enhanced at particular wavelengths from the interference phenomena.

Various approaches have been used to achieve such color shifting effects. For example, small multilayer flakes, typically composed of multiple layers of thin films, are dispersed throughout a medium such as paint or ink that may then be subsequently applied to the surface of an object. Such flakes may optionally be overcoated to achieve desired colors and optical effects. Another approach is to encapsulate small metallic or silicatic substrates with varying layers and then disperse the encapsulated substrates throughout a medium such as paint or ink. Additionally, foils composed of multiple layers of thin films on a substrate material have been made.

One manner of producing a multilayer thin film structure is by forming it on a flexible web material with a release layer thereon. The various layers are deposited on the web by methods well known in the art of forming thin coating structures, such as PVD, sputtering, or the like. The multilayer thin film structure is then removed from the web material as thin film color shifting flakes, which can be added to a polymeric medium such as various pigment vehicles for use as an ink or paint. In addition to the color shifting flakes, additives can be added to the inks or paints to obtain desired color shifting results.

Color shifting pigments or foils are formed from a multilayer thin film structure that includes the same basic layers. These include an absorber layer(s), a dielectric layer(s), and optionally a reflector layer, in varying layer orders. The coatings can be formed to have a symmetrical multilayer thin film structure, such as:

absorber/dielectric/reflector/dielectric/absorber; or
absorber/dielectric/absorber.

Coatings can also be formed to have an asymmetrical multilayer thin film structure, such as:

absorber/dielectric/reflector.

For example, U.S. Pat. No. 5,135,812 to Phillips et al. discloses optically variable thin film flakes having several different configurations of layers such as transparent dielectric and semi-transparent metallic layered stacks. In U.S. Pat. No. 5,278,590 to Phillips et al., incorporated by reference herein, a symmetric three layer optical interference coating is disclosed which comprises first and second partially transmitting absorber layers which have essentially the same composition and thickness, and a dielectric spacer layer located between the first and second absorber layers.

Color shifting platelets for use in paints are disclosed in U.S. Pat. No. 5,571,624 to Phillips et al., which is incorporated by reference herein. These platelets are formed from a symmetrical multilayer thin film structure in which a first semi-opaque layer such as chromium is formed on a substrate, with a first dielectric layer formed on the first semi-opaque layer. An opaque reflecting metal layer such as aluminum is formed on the first dielectric layer, followed by a second dielectric layer of the same material and thickness as the first dielectric layer. A second semi-opaque layer of the same material and thickness as the first semi-opaque layer is formed on the second dielectric layer.

Interference pigments having titanium dioxide layers have been previously produced. For example, U.S. Pat. No. 5,116,664 to Kimura et al. discloses a pigment that is made by coating a first layer of $TiO_2$ onto mica followed by coating the $TiO_2$ layer with powder particles of at least one of the metals cobalt, nickel, copper, zinc, tin, gold, and silver. The metallic powder layer is deposited by an electroless wet chemical process. Electron micrographs showed that these particles are in the form of finely divided rods.

Interference pigments incorporating titanium oxide layers are disclosed in U.S. Pat. No. 5,364,467 to Schmid et al. and U.S. Pat. No. 5,573,584 Ostertag et al. Each of these patents teaches colorless, non-absorbing $TiO_2$ layers or selectively absorbing metal oxide materials for overcoating platelet-like silicatic substrates (micas, talc or glass flakes) or platelet-like metallic substrates.

U.S. Pat. No. 5,607,504 to Schmid et al. discloses pigments with titanium(III) oxide, titanium oxynitride, and titanium nitride coatings, formed by the reduction of titanium dioxide. The pigment particles are composed of various metal substrates upon which is deposited a selectively absorbing coating of titanium oxynitrides and titanium nitride with titanium dioxide and titanium III oxide by using hydrolytic decomposition of titanium tetraisopropoxide or titanium tetrachloride and subsequent reduction with ammonia.

In U.S. Pat. No. 4,978,394 to Ostertag, metal oxide coated aluminum pigments are disclosed, which include a substrate of platelet-like aluminum coated with layers of titanium oxides of different thicknesses. The titanium oxide layers are formed by a chemical vapor deposition process whereby titanium tetrachloride is reacted with water vapor. Optionally, the titanium dioxide layer can then be reduced to form TiO, TiN, or titanium oxynitrides through the use of $H_2$, CO, hydrocarbons or $NH_3$.

The electroless deposition methods and pyrolytic methods used in conventional techniques such as described above produce large islands or dots of material deposited on the substrate material. Hence, a continuous coating is only obtained at the expense of depositing enough coating material to sufficiently coat the gaps between the islands or dots. This extensive deposition leads in turn to a relatively thick coating which, because of its thickness, does not generate the best chromatic colors.

Prior techniques for forming titanium-based coatings on a substrate have been limited to reducing an underlying titanium dioxide layer, resulting in a non-discrete layer interface. It is believed that the reduction of $TiO_2$ layers results in high stress as the coating changes in chemical structure. As a result, voids may form in the coating if the new chemical structure requires less surface area and volume. Alternatively, bubbling may occur if the coating expands beyond its current surface area and volume because of a larger surface area being required to accommodate the change in chemical structure. The structural flaws degrade the optical qualities of the pigment.

Another difficulty with prior titanium coating techniques is that following the deposition of a titanium coating on a powdered substrate, the coated powder may auto-ignite by the spontaneous oxidization that can occur with a release of heat, as can happen during atmospheric venting of the vacuum chamber in a vacuum deposition process. Since the powder particles are poor conductors of heat, the heat is trapped and a runaway oxidation occurs which consumes the entire powder mass.

Accordingly, there is a need for alternative absorber materials and coating techniques which avoid the above drawbacks.

SUMMARY AND OBJECTS OF THE INVENTION

It is an object of the present invention to provide interference pigment flakes and foils which exhibit color shifting properties.

It is another object of the invention to provide color shifting flakes which may be easily and economically utilized in colorants such as paints and inks for various applications.

It is a further object of the invention to provide color shifting flakes and foils with environmentally safe absorbers.

Another object of the invention is to provide color shifting flakes that have non-stick properties during fabrication.

A further object of the invention is to provide color shifting flakes that are not prone to auto-ignition during fabrication.

An additional object of the invention is to provide a titanium-based absorber that can be deposited as a discrete uniform layer of easily repeatable thickness during fabrication of pigment flakes or foils.

A further object of the invention is to provide color shifting interference pigments and foils that exhibit high chroma and good stability toward water, acid, base, bleach, and ultraviolet radiation exposure.

To achieve the forgoing objects and in accordance with the invention as embodied and broadly described herein, interference pigment flakes and foils are provided which have color shifting properties. The pigment flakes can have a symmetrical coating structure on opposing sides of a reflector layer, can have an asymmetrical coating structure with all of the layers on one side of the reflector layer, or can be formed with encapsulating coatings around a core reflector layer. The coating structure of the flakes and foils includes a reflector layer, a dielectric layer on the reflector layer, and a titanium-containing absorber layer on the dielectric layer. The absorber layer can be composed of elemental titanium, a titanium-based compound, or a titanium-based alloy. The titanium-containing absorber layer provides the benefits of having benign chemical characteristics, as well as avoiding metal welding during the flake coating process. Titanium-based absorbers are also provided herein which avoid the auto-ignition problem of prior titanium coating techniques.

The pigment flakes and foils exhibit a discrete color shift so as to have a first color at a first angle of incident light or viewing and a second color different from the first color at a second angle of incident light or viewing. The pigment flakes can be interspersed into liquid media such as paints or inks to produce colorant compositions for subsequent application to objects or papers. The foils can be laminated to various objects or can be formed on a carrier substrate.

The foregoing objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 19A and 19B make up an L*a*b* diagram which plots the color trajectory and chromaticity of a color shifting foil of the invention.

DETAILED DESCRIPTION OF THE INVENTION

Figure 1:
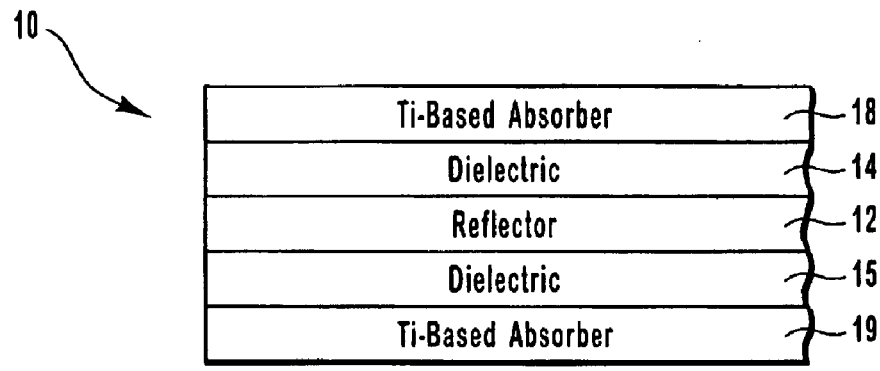
FIG. 1 is a schematic representation of the coating structure of a color shifting pigment flake according to one embodiment of the invention.

The present invention is directed generally to color shifting pigments and foils having titanium-containing absorber layers and methods of making the same. The pigment flakes and foils have substantial shifts in chroma and hue with changes in angle of incident light or viewing angle of an observer. Such an optical effect, known as goniochromaticity, allows a perceived color to vary with the angle of illumination or observation. Accordingly, the pigment flakes and foils exhibit a first color at a first angle of incident light or viewing and a second color different from the first color at a second angle of incident light or viewing. The pigment flakes can be interspersed into liquid media such as paints or inks to produce various color shifting colorant compositions for subsequent application to objects or papers. The foils can be laminated to various objects or can be formed on a carrier substrate.

Generally, the pigment flakes can have a symmetrical coating structure on opposing sides of a reflector layer, can have an asymmetrical coating structure with all of the layers on one side of the reflector layer, or can be formed with encapsulating coatings which surround a reflector layer core. The coating structure of the flakes and foils generally includes a reflector layer, a dielectric layer on the reflector layer, and a titanium-containing absorber layer on the dielectric layer. Each of these layers in the coating structures of the flakes and foils of the invention will be discussed in further detail hereinafter. It is a feature of the invention that as least one absorber layer of the pigment or foil is a titanium or titanium-based absorber that is deposited as a discrete, outermost layer of the pigment flake or foil.

The color shifting flakes and foils of the invention can be formed using conventional thin film deposition techniques, which are well known in the art of forming thin coating structures. Nonlimiting examples of such thin film deposition techniques include physical vapor deposition (PVD), chemical vapor deposition (CVD), plasma enhanced (PE) variations thereof such as PECVD or downstream PECVD, sputtering, electrolysis deposition, and other like deposition methods that lead to the formation of discrete and uniform thin film layers.

The color shifting pigment flakes of the invention can be formed by various fabrication methods. For example, the pigment flakes can be formed by a web coating process in which various layers are sequentially deposited on a web material by conventional deposition techniques to form a thin film structure, which is subsequently fractured and removed from the web, such as by use of a solvent, to form a plurality of thin film flakes.

In another fabrication method, one or more thin film layers including at least the reflector layer is deposited on a web to form a film, which is subsequently fractured and removed from the web to form a plurality of pigment preflakes. The preflakes can be fragmented further by grinding if desired. The preflakes are then coated with the remaining layer or layers in a sequential encapsulation process to form a plurality of pigment flakes. Such a process is disclosed in further detail in copending U.S. application Ser. No. 09/512,116, filed on Feb. 24, 2000, the disclosure of which is incorporated by reference herein.

In another alternative fabrication method, reflective particles can be coated in a sequential encapsulation process to form a plurality of pigment flakes. When an encapsulation process is used for forming the outer layers of the flakes, it will be appreciated that each respective encapsulating layer is a continuous layer composed of one material and having substantially the same thickness around the flake structure.

Referring to the drawings, wherein like structures are provided with like reference designations, the drawings only show the structures necessary to understand the present invention. FIG. 1 depicts a color shifting pigment flake 10 with titanium-containing absorber layers according to one embodiment of the invention. The flake 10 is a five-layer design having a generally symmetrical multilayer thin film structure on opposing sides of a reflector layer 12. Thus, first and second dielectric layers 14 and 15 are disposed respectively on opposing sides of reflector layer 12, and first and second titanium-based absorber layers 18 and 19 are disposed respectively on each of dielectric layers 14 and 15. Each of these layers in the coating structure of flake 10 is discussed below in greater detail.

The reflector layer 12 can be composed of various materials. Presently preferred materials are one or more metals, one or more metal alloys, or combinations thereof, because of their high reflectivity and ease of use, although nonmetallic reflective materials could also be used. Nonlimiting examples of suitable metallic materials for reflector layer 12 include aluminum, silver, copper, gold, platinum, tin, titanium, palladium, nickel, cobalt, rhodium, niobium, chromium, and combinations or alloys thereof. These can be selected based on the color effects desired. The reflector layer 12 can be formed to have a suitable physical thickness of from about 200 angstroms (Å) to about 1000 Å, and preferably from about 400 Å to about 700 Å.

The dielectric layers 14 and 15 act as spacers in the thin film stack structure of flake 10. These layers are formed to have an effective optical thickness for imparting interference color and desired color shifting properties. The dielectric layers may be optionally clear, or may be selectively absorbing so as to contribute to the color effect of a pigment. The optical thickness is a well known optical parameter defined as the product ηd, where η is the refractive index of the layer and d is the physical thickness of the layer. Typically, the optical thickness of a layer is expressed in terms of a quarter wave optical thickness (QWOT) that is equal to 4ηd/λ, where λ is the wavelength at which a QWOT condition occurs. The optical thickness of dielectric layers can range from about 2 QWOT at a design wavelength of about 400 nm to about 9 QWOT at a design wavelength of about 700 nm, and preferably 2–6 QWOT at 400–700 nm, depending upon the color shift desired. The dielectric layers typically have a physical thickness of about 100 nm to about 800 nm.

Suitable materials for dielectric layers 14 and 15 include those having a "high" index of refraction, defined herein as greater than about 1.65, as well as those have a "low" index of refraction, which is defined herein as about 1.65 or less. Each of the dielectric layers can be formed of a single material or with a variety of material combinations and configurations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations and configurations as described above.

Examples of suitable high refractive index materials for the dielectric layer include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide (Ta2O5), ceric oxide ($CeO_2$), yttrium oxide ($Y_2O_3$), europium oxide ($EU_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like.

Suitable low refractive index materials for the dielectric layer include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon:oxygen ratios, respectively, but the actual silicon:oxygen ratio of a particular dielectric coating layer varies somewhat from these nominal values. Such non-stoichiometric dielectric materials are also within the scope of the present invention.

As mentioned above, the dielectric layers can be formed of high/low dielectric optical stacks, which have alternating layers of low index (L) and high index (H) materials. When a dielectric layer is formed of a high/low dielectric stack, the color shift at angle will depend on the combined refractive index of the layers in the stack. Examples of suitable stack configurations for the dielectric layers include LH, HL, LHL, HLH, HLHL, LHLH, as well as various multiples and combinations thereof. In these stacks, LH, for example, indicates discrete layers of a low index material and a high index material. In an alternative embodiment, the high/low dielectric stacks are formed with a gradient index of refraction. For example, the stack can be formed with layers having a graded index low-to-high, a graded index high-to-low, a graded index low-to-high-to-low, a graded index high-to-low-to-high, as well as combinations and multiples thereof. The graded index is produced by a gradual variance in the refractive index, such as low-to-high index or high-to-low index, of adjacent layers. The graded index of the layers can be produced by changing gases during deposition or co-depositing two materials (e.g., L and H) in differing proportions. Various high/low optical stacks can be used to enhance color shifting performance, provide antireflective properties to the dielectric layer, and change the possible color space of the pigments of the invention.

The dielectric layers can each be composed of the same material or a different material, and can have the same or different optical or physical thickness for each layer. It will be appreciated that when the dielectric layers are composed of different materials or have different thicknesses, the flakes exhibit different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

The titanium-based absorber layers 18 and 19 can be composed of an absorbing material, including selective and non-selective absorbing materials, having the desired absorption properties. The absorbing material is preferably substantially free of titanium dioxide. The terms "substantially free" as used herein means that while $TiO_2$ is not intentionally formed in the absorber layers, trace amounts of $TiO_2$ can exist in the absorber layers because of the high reactivity of Ti with $O_2$. The titanium-containing absorber layers used in the present invention are non-toxic, durable, and maintain good optical properties such as high chroma.

The absorber layers 18 and 19 can be composed of elemental titanium, titanium-based alloys, titanium-based compounds, or mixtures thereof. Examples of suitable titanium-based alloys include titanium mixed with carbon (Ti/C), titanium mixed with tungsten (Ti/W), titanium mixed with niobium (Ti/Nb), titanium mixed with silicon (Ti/Si), and combinations thereof. Examples of suitable titanium-based compounds include titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide (TiSi$_2$), titanium diboride (TiB$_2$), and combinations thereof. In the case of TiN$_x$O$_y$ and TiN$_x$O$_y$C$_z$, preferably x=0 to 1, y=0 to 1, and z=0 to 1, where x+y=1 in TiN$_x$O$_y$ and x+y+z=1 in TiN$_x$O$_y$C$_z$. For TiN$_x$C$_z$, preferably x=0 to 1 and z=0 to 1, where x+z=1. The absorber layers may also be composed of various combinations of the above absorbing materials. For example, an absorber layer can be composed of a titanium-based alloy disposed in a matrix of Ti, or can be composed of Ti disposed in a matrix of a titanium-based alloy.

The titanium-containing absorber layers can be formed to have a suitable physical thickness of from about 30 Å to about 300 Å, preferably from about 100 Å to about 175 Å. The absorber layers can each be composed of the same titanium-based material or different titanium-based materials, and can have the same or different physical thickness for each layer. The titanium-containing absorber layers are preferably non-toxic, durable and maintain good optical properties as absorber layers such as high chroma.

One presently preferred method of fabricating a plurality of pigment flakes, each of which have the multilayer thin film coating structure of flake 10, is based on conventional web coating techniques used to make optical thin films. Accordingly, a first titanium-containing absorber layer is deposited on a web of flexible material such as polyethylene terephthalate (PET) which has an optional release layer thereon. The absorber layer can be formed by a conventional deposition process such as PVD, CVD, PECVD, sputtering, or the like. The above mentioned deposition methods enable the formation of a discrete and uniform layer absorber layer of a desired thickness.

Next, a first dielectric layer is deposited on the titanium-containing absorber layer to a desired optical thickness by a conventional deposition process. The deposition of the dielectric layer can be accomplished by a vapor deposition process (e.g., PVD, CVD, PECVD), which results in the dielectric layer cracking under the stresses imposed as the dielectric transitions from the vapor into the solid phase.

The reflector layer is then deposited on the first dielectric layer, taking on the characteristics of the underlying cracked dielectric layer. This is followed by a second dielectric layer being deposited on the reflector layer and preferably having the same optical thickness as the first dielectric layer. Finally, a second titanium-containing absorber layer is deposited on the second dielectric layer and preferably has the same physical thickness as the first absorber layer.

Thereafter, the flexible web is removed, either by dissolution in a preselected liquid or by way of a release layer, both of which are well known to those skilled in the art. As a result, a plurality of flakes are fractured out along the cracks of the layers during removal of the web from the multilayer thin film. This method of manufacturing pigment flakes is similar to that more fully described in U.S. Pat. No. 5,135,812 to Phillips et al., the disclosure of which is incorporated by reference herein. The pigment flakes can be further fragmented if desired by, for example, grinding the flakes to a desired size using an air grind, such that each of the pigment flakes has a dimension on any surface thereof ranging from about 2 microns to about 200 microns.

In an alternative embodiment of flake 10, an asymmetrical color shifting flake can be provided which includes a three-layer thin film stack structure with the same layers as on one side of the reflector layer in flake 10 as shown in FIG. 1. Accordingly, the asymmetrical color shifting flake includes reflector layer 12, dielectric layer 14 on reflector 12, and absorber layer 18 on dielectric layer 14. Each of these layers can be composed of the same materials and have the same thicknesses as described above for the corresponding layers of flake 10. In addition, asymmetrical color shifting flakes can be formed by a web coating process such as described above in which the various layers are sequentially deposited on a web material to form a thin film structure, which is subsequently fractured and removed from the web to form a plurality of flakes.

Figure 2:
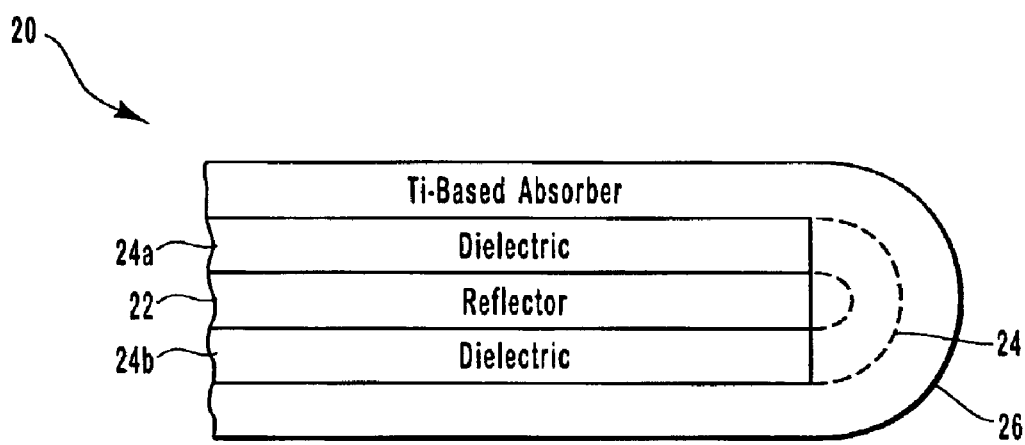
FIG. 2 is a cross-sectional schematic representation of the coating structure of a color shifting pigment flake according to another embodiment of the invention.

FIG. 2 depicts alternative coating structures (with phantom lines) for a color shifting pigment flake 20 in the form of an encapsulate according to other embodiments of the invention. The flake 20 has a core reflector layer 22, which can be overcoated by an encapsulating dielectric layer 24 substantially surrounding the reflector layer 22. A titanium-based absorber layer 26, which overcoats dielectric layer 24, provides an outer encapsulation of flake 20. The hemispherical lines on one side of flake 20 in FIG. 2 indicate that dielectric layer 24 and titanium-based absorber layer 26 can be formed as contiguous layers.

Alternatively, the reflector layer and dielectric layer can be in the form of a thin film core flake stack, in which opposing dielectric layers 24a and 24b are preformed on the top and bottom surfaces but not on at least one side surface of reflector layer 22, with absorber layer 26 encapsulating the thin film stack. An encapsulation process can also be used to form additional layers on flake 20 such as a capping layer (not shown). Suitable materials and thicknesses for the absorber, dielectric, and reflector layers of flake 20 are the same as taught hereinabove for flake 10.

In addition, core reflector layer 22 can be a multi-layered core flake section structure, such as a "bright metal flake" as disclosed in U.S. Pat. No. 6,013,370 to Coulter et al., and U.S. application Ser. No. 09/207,121, filed Dec. 7, 1998, the disclosures of which are incorporated by reference herein. Such a multi-layered structure includes a reflector sublayer having a top surface, a bottom surface, and at least one side surface, and a support sublayer preformed on at least one of the top and bottom surfaces but not on the at least one side surface of the reflector sublayer. The reflector sublayer can be a metal such as aluminum having a thickness of at least about 40 nm, and the support layer(s) can be a dielectric such as silicon oxide having a thickness of at least about 10 nm, with the thickness being chosen so that the dielectric sub-layers do not substantially affect the color properties of the reflector sublayer. For example, a multilayered core flake section can have the coating structure SiO$_x$/Al/SiO$_x$, where x is from about 1 to about 2.

The core reflector layer 22 can also be a multi-layered structure such as a "composite reflective flake" as disclosed in copending U.S. application Ser. No. 09/626,041 to Coulter et al., filed Jul. 27, 2000, the disclosure of which is incorporated by reference herein. Such a multi-layered structure includes a central support sublayer having a top surface, a bottom surface, and at least one side surface, and a reflector sublayer preformed on one or both of the top and bottom surfaces but not on the at least one side surface of the reflector sublayer.

Figure 3:
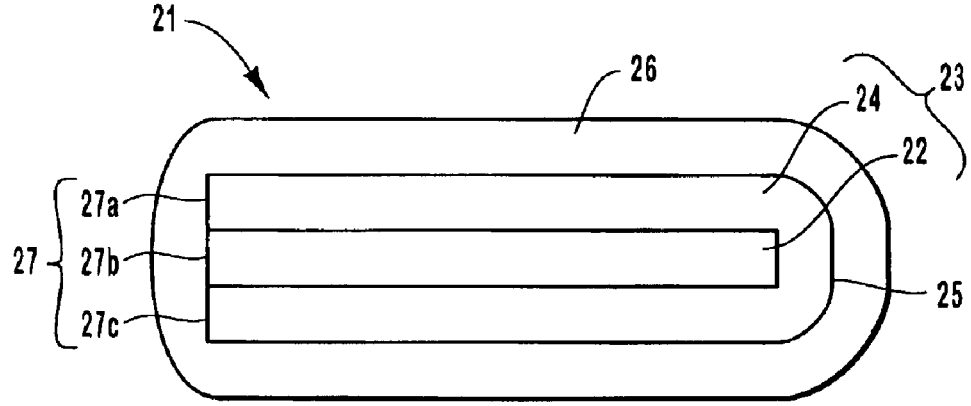
FIG. 3 is a cross-sectional schematic representation of the coating structure of a color shifting pigment flake according to an alternative embodiment of the invention.

FIG. 3 depicts another alternative coating structure for a color shifting pigment flake 21 according to the present invention. The flake 21 includes a core reflector layer 22 and a single dielectric layer 24, which extends over top and bottom surfaces of reflector layer 22 to form a dielectric-coated preflake 23. The dielectric-coated preflake 23 has two side surfaces 25 and 27. Although side surface 25 is homogeneous and formed only of the dielectric material of dielectric layer 24, side surface 27 has distinct surface regions 27a, 27b, 27c of dielectric, reflector, and dielectric, respectively. The dielectric-coated preflake 23 is further coated on all sides with a titanium-containing absorber layer 26. The absorber layer 26 is in contact with dielectric layer 24 and reflector layer 22 at side surface 27.

The structure of pigment flake 21 typically occurs because of a preflake coating process such as disclosed in U.S. application Ser. No. 09/512,116 described previously. As described therein, the preflakes can be a dielectric-coated flake, in which a dielectric coating completely encapsulates a core flake section. The preflakes are broken into sized preflakes using any conventional fragmentation process, such as by grinding. The sized preflakes will include some sized preflakes having top and bottom dielectric layers with no dielectric coating on the side surfaces of the preflake, such as shown for the embodiment of flake 20 in FIG. 2 in which reflector layer 22 is coated with top and bottom dielectric layers 24a and 24b. Other sized preflakes will have a single dielectric layer extending over both top and bottom surfaces of the core flake section, leaving one side surface of the core flake section exposed, such as shown for dielectric-coated preflake 23 in FIG. 3. Because of the fragmentation process, substantially all of the sized preflakes have at least a portion of a side surface exposed. The sized preflakes are then coated on all sides with a titanium-containing absorber layer, such as shown in the flakes of FIGS. 2 and 3.

Figure 4:
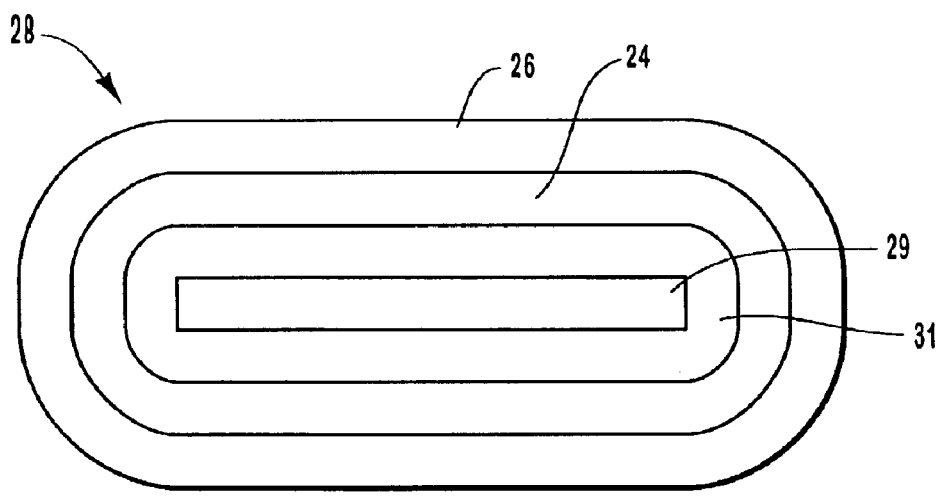
FIG. 4 is a cross-sectional schematic representation of the coating structure of a color shifting pigment flake according to a further embodiment of the invention.

FIG. 4 depicts another alternative coating structure for a color shifting pigment flake 28 in the form of an encapsulate. The flake 28 has a thin core layer 29, which can be formed of a particulate substrate material that provides rigidity, such as mica, glass flake, talc, or other silicatic material, as well as iron oxide, boron nitride, and the like. The core layer 29 is overcoated on all sides with a reflector coating 31, such as a reflective metallic coating, which can be composed of the same materials as described above for reflector layer 12 of flake 10. An encapsulating dielectric layer 24 substantially surrounds core layer 29 and reflector coating 31. A titanium-based absorber layer 26, which overcoats dielectric layer 24, provides an outer encapsulation of flake 28.

Various coating processes can be utilized in forming the dielectric and absorber coating layers by encapsulation. For example, suitable preferred methods for forming the dielectric layer include vacuum vapor deposition, sol-gel hydrolysis, CVD in a fluidized bed, and electrochemical deposition. A suitable $SiO_2$ sol-gel process is described in U.S. U.S. Pat. No. 5,858,078 to Andes et al., the disclosure of which is incorporated by reference herein. Other examples of suitable sol-gel coating techniques useful in the present invention are disclosed in U.S. Pat. No. 4,756,771 to Brodalla; Zink et al., *Optical Probes and Properties of Aluminosilicate Glasses Prepared by the Sol-Gel Method*, Polym. Mater. Sci. Eng., 61, pp. 204–208 (1989); and McKiernan et al., *Luminescence and Laser Action of Coumarin Dyes Doped in Silicate and Aluminosilicate Glasses Prepared by the Sol-Gel Technique*, J. Inorg. Organomet. Polym., 1(1), pp. 87–103 (1991); with the disclosures of each of these incorporated by reference herein.

Suitable preferred methods for forming the absorber layers include vacuum vapor deposition, and sputtering onto a mechanically vibrating bed of particles, as disclosed in commonly assigned copending patent application Ser. No. 09/389,962, filed Sep. 3, 1999, entitled "Methods and Apparatus for Producing Enhanced Interference Pigments," which is incorporated by reference herein in its entirety. Alternatively, the absorber coating may be deposited by decomposition through pyrolysis of metal-organo compounds or related CVD processes which may be carried out in a fluidized bed as described in U.S. Pat. Nos. 5,364,467 and 5,763,086 to Schmid et al., the disclosures of which are incorporated by reference herein. If no further grinding is carried out, these methods result in an encapsulated core flake section with dielectric and absorber materials therearound. Various combinations of the above coating processes may be utilized during manufacture of pigment flakes with multiple encapsulating coatings.

In one preferred method, a sol-gel process is used as part of the fabrication method in producing coated powdered flakes of the invention, each of which have the coating structure of flake 20. The core reflector layer 22 in such flakes is a bright metal flake (BMF), which in one embodiment is deposited on a roll coater release layer as $SiO_x/Al/SiO_x$ and removed as flakes by dissolving the release layer. An encapsulating dielectric layer 24 is then formed around the flakes by a sol-gel process, which in one embodiment produces a sol-gel $SiO_2$ coating. This is effected by placing the flakes in a stirred reactor with isopropyl alcohol (IPA), water, ammonia, and tetraethoxysilane (TEOS). The TEOS is reactively decomposed to form $SiO_2$ onto the surfaces of the $SiO_x$ of the BMF.

This sol-gel based powdered flake material is then dried and fed into a particle vacuum coating chamber to be coated with a titanium-based absorber layer 26 on each flake, such as a titanium/carbon mixture, titanium carbide, titanium nitride, titanium nitride carbide, or a mixture of titanium plus the aforementioned materials. In the case of titanium/carbon, the deposition on the flakes can occur in a sputtering process, such as direct magnetron sputtering, by running more than one target where one or more targets are set to sputter titanium and the other target(s) are set to sputter carbon. Alternatively, a reactive sputtering process can be utilized to deposit titanium nitride, titanium carbide, or titanium nitride carbide layers by running a target set to sputter titanium, along with nitrogen and/or methane gases (e.g., $Ti+N_2+CH_4 \rightarrow TiN_xC_z$). An in-situ color monitor can be used to indicate the highest level of chroma on the coated particles in order to determine coating time. The coating chamber is then cooled and carefully backfilled with atmospheric air until the chamber reaches atmospheric pressure.

In one method of forming the titanium-containing coating, the sol-gel powdered flakes or other coated preflakes are placed on a square-shaped vibrating conveyor coater in a vacuum coating chamber as disclosed in U.S. application Ser. No. 09/389,962, discussed above. The vibrating conveyor coater includes conveyor trays which are configured in an overlapping inclined arrangement so that the powdered flakes travel along a circulating path within the vacuum chamber. While the flakes circulate along this path they are effectively mixed by constant agitation so that exposure to the vaporized absorber coating material is uniform. Efficient mixing also occurs at the end of each conveyor tray as the flakes drop in a waterfall off of one tray and onto the next tray. The absorber can be sequentially coated on the flakes as they repeatably move under a coating material source.

When using vibrating conveyer trays to coat the absorber, it is important that the powdered flakes tumble randomly under the coating material source such as sputter targets and do not become subject to "metal welding" or sticking. Such metal welding or sticking can occur between two flat surfaces of reactive metals when such metals are deposited in a vacuum. For example, aluminum has a high propensity to stick to itself, whereas chromium does not. It has been discovered that the titanium-based absorber coatings of the present invention provide lubricity to the flake particles so that metal welding or sticking of the newly coated surfaces does not occur, allowing for the flow of flake particles against one another as they travel along the vibrating trays. Preferred titanium-based absorber materials which provide suitable lubricity and allow for good flowability include a titanium/carbon mixture, titanium carbide, and titanium nitride (e.g., titanium sputtered reactively with nitrogen). Such absorber materials can be applied as either a single material or as an outer capping layer over an underlying different absorber material. Titanium nitride may be also be mixed with titanium in such an amount so as to allow good flowability and avoid auto-ignition upon exposing the pigment flakes to atmospheric pressure.

In addition, $TiO_2$ or other metal oxides can be added as an outer capping layer over an underlying Ti-based absorber layer in the pigment flakes of the invention. The deposition of a capping layer in vacuum aids in avoiding the auto-ignition problem of prior titanium coating techniques, since the capping layer helps to stabilize the pigment flake product when brought into the atmosphere.

Another method of depositing the titanium-containing absorbers of the invention is by plasma enhanced chemical vapor deposition (PECVD) where the chemical species are activated by a plasma. In PECVD processes, thin film deposition occurs at lower temperatures than can be achieved with other CVD reactors, without sacrificing quality. The PECVD processes use electrical energy to transform a gas mixture into a plasma containing reactive radicals, ions, neutral atoms and molecules, as well as other reactive species. Because the reactions occur by collisional processes in the gas phase, the temperature can be kept lower than in typical CVD processes. Different techniques can be used to apply a plasma, the most common being radio frequency (RF) and microwave (MW) plasma discharges. Also, depending on the substrate position, the PECVD process can be categorized as direct PECVD or downstream PECVD (DsPECVD).

In the case of direct PECVD, all the chemical species in the gas phase are plasma activated. In DsPECVD, the process gases and the reactant or precursors gases can be separated, the process gases being exposed to the direct plasma and the precursors or reactant gases introduced downstream in the plasma. Although both forms of PECVD can be utilized, the DsPECVD configuration is advantageous because there is no deposition of the film on the dielectric walls of the plasma applicator or contamination of the applicators from the powdered substrate.

For DsPECVD, it is desirable to have a high-density plasma source (e.g., ion densities greater than $10^{11}$ $cm^3$). Typically, inductive coupling of RF power (0.5 to 100 MHz) can produce ion densities in excess of $10^{12}$ $cm^3$. In the case of a downstream plasma, the inductive circuit element is adjacent (outside a dielectric wall) to the discharge region in order to couple energy from the RF power source to an ionized gas. Depending on the configuration, RF power source couplers can be categorized as helical couplers, helical resonators, spiral couplers, and transformer couplers.

High-density plasmas can also be obtained using microwave discharges. Typically, for microwave plasma generation outside a reactor, rectangular wave-guides guide the microwaves from a generator to a plasma applicator. The plasma generated in this way inside a dielectric chamber is sufficient for the effective activation of process and reactive gases introduced directly in the plasma (direct PECVD) or downstream (DsPECVD).

In the case of titanium nitride, titanium carbide, or titanium nitride carbide coatings formed by a PECVD process, a titanium-containing gas is reacted with a working gas such as nitrogen (forming titanium nitride) or a hydrocarbon gas such as methane (forming titanium carbide) or both (forming titanium nitride carbide) and deposited on the flakes. Suitable sources for the titanium-containing gas include titanium halides such as titanium tetrachloride ($TiCl_4$), and metalloorganic titanium compounds. It should be noted that when TiN, TiC, or $TiN_xC_z$ absorbers are deposited by a PECVD process, these compounds can be considered as $TiN_xO_y$, $TiC_xO_y$, and $TiN_xO_yC_z$, respectively, because of oxygen contamination in the plasma reactors and the high reactivity of titanium to oxygen. The PECVD processes result in good coating adhesion, low pinhole density, good step coverage, and coating uniformity.

Figure 5:
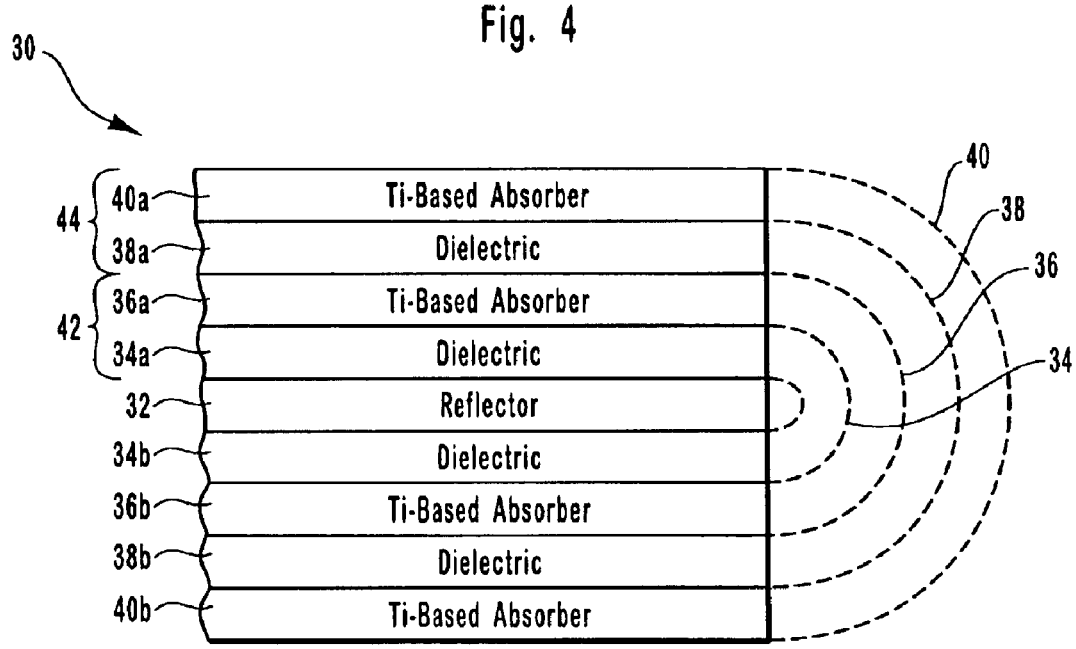
FIG. 5 is a schematic representation of the coating structure of a color shifting pigment flake according to another embodiment of the invention.

FIG. 5 depicts a color shifting pigment flake 30 according to another embodiment of the invention. The flake 30 is a nine-layer design having a generally symmetrical multilayer thin film stack structure on opposing sides of a reflector layer 32. Thus, first and second dielectric layers 34a and 34b are disposed respectively on opposing sides of reflector layer 32, and first and second titanium-based absorber layers 36a and 36b are disposed respectively on each of dielectric layers 34a and 34b. A third dielectric layer 38a is formed on absorber layer 36a, and a fourth dielectric layer 38b is formed on absorber layer 36b. A third titanium-based absorber layer 40a is on dielectric layer 38a, and a fourth titanium-based absorber layer 40b is on dielectric layer 38b. These layers of flake 30 can be formed by a web coating and flake removal process as described previously.

As shown in FIG. 5, each dielectric and absorber layer pair forms a repeating period 42, 44 of dielectric/absorber (e.g., layers 34a and 36a, and layers 38a and 40a). One or more additional periods of dielectric/absorber layers may be added to flake 30 to obtain a desired optical effect.

FIG. 5 further shows an alternative coating structure (with phantom lines) for color shifting flake 30, in which one or more of the absorber layers and dielectric layers are coated around reflector layer 32 in an encapsulation process. For example, when an encapsulation process is used for the outer absorber layer, absorber layers 40a and 40b are formed as part of a continuous coating layer 40 substantially surrounding the flake structure thereunder. Likewise, an encapsulation process can also be used in forming the underlying dielectric layer, such that dielectric layers 38a and 38b are formed as part of a continuous coating layer 38 substantially surrounding the flake structure thereunder. An encapsulation process can also be used in forming the other dielectric and absorber layers 34 and 36, such that reflector layer 32 is encapsulated sequentially with alternating dielectric and absorber layers.

Thus, pigment flake 30 may be embodied either as a multilayer thin film stack flake or a multilayer thin film encapsulated particle with one or more encapsulating layers therearound. Suitable materials and thicknesses for the absorber, dielectric, and reflector layers of flake 30 are the same as taught hereinabove for flake 10.

Figure 6:
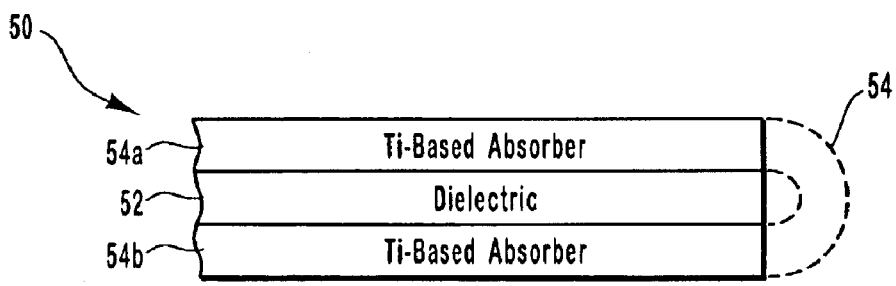
FIG. 6 is a schematic representation of the coating structure of a color shifting pigment flake according to an additional embodiment of the invention.

FIG. 6 depicts a color shifting pigment flake 50 according to another embodiment of the invention which does not use a reflector. The flake 50 is a three-layer design having a generally symmetrical multilayer thin film structure on opposing sides of a dielectric layer. Thus, first and second titanium-based absorber layers 54a and 54b are formed on opposing major surfaces of dielectric layer 52. These layers of flake 50 can be formed by a web coating and flake removal process as described previously.

FIG. 6 further depicts an alternative coating structure (with phantom lines) for color shifting flake 50, in which the absorber layer is coated around dielectric layer 52 in an encapsulation process. Accordingly, absorber layers 54a and 54b are formed as part of a continuous coating layer 54 substantially surrounding the flake structure thereunder.

Thus, pigment flake 50 may be embodied either as a multilayer thin film stack flake or a multilayer thin film encapsulated particle. Suitable materials and thicknesses for the absorber and dielectric layers of flake 50 are the same as taught hereinabove for flake 10.

Figure 7:
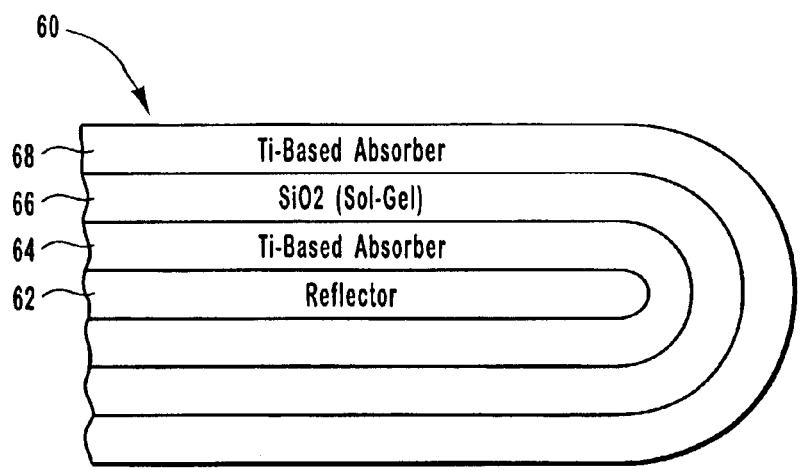
FIG. 7 is a cross-sectional schematic representation of the coating structure of a color shifting pigment flake according to a further embodiment of the invention.

FIG. 7 illustrates a pigment flake 60 according to a further embodiment of the present invention. Pigment flake 60 comprises a core layer 62 which is substantially encapsulated by a first titanium-based absorber layer 64 by a coating process, such as by use of a vibrating tray system as described previously. The absorber layer 64 is in turn encapsulated by a silicon dioxide layer 66 formed by a sol-gel process. A second titanium-based absorber layer 68 encapsulates silicon dioxide layer 66. Thus, pigment flake 60 is embodied as a multilayer thin film encapsulated particle. The core layer 62 is preferably a flat, transparent planar material such as mica, glass, or other like dielectric material, which gives strength to the flake. Suitable materials and thicknesses for the absorber layers of flake 60 are the same as taught hereinabove for flake 10. A high index $TiO_2$ sol-gel based layer may be substituted for the $SiO_2$ sol-gel layer in flake 60 to provide a pigment with a smaller color shift.

The coating methods utilized in the present invention to form the above described embodiments result in the titanium-containing absorber layer being formed on the underlying dielectric layer such that the absorber layer has a discrete boundary interface with the underlying dielectric layer. The coating methods used in the invention also result in discrete uniform absorber layers that are more easily repeatable.

The present coating methods for depositing titanium-based absorbers are also advantageous over conventional non-deposition techniques. For example, the conventional method of obtaining titanium-based layers by the reduction of $TiO_2$ to $TiN_x$ in ammonia will result in a crystalline structure of non-uniform thickness with no discrete, sharp interlayer interface. In contrast, the present deposition methods taught herein result in the titanium-containing absorber layer being composed of an amorphous absorbing material with substantially no crystalline structure, having a well defined interlayer interface.

Figure 8:
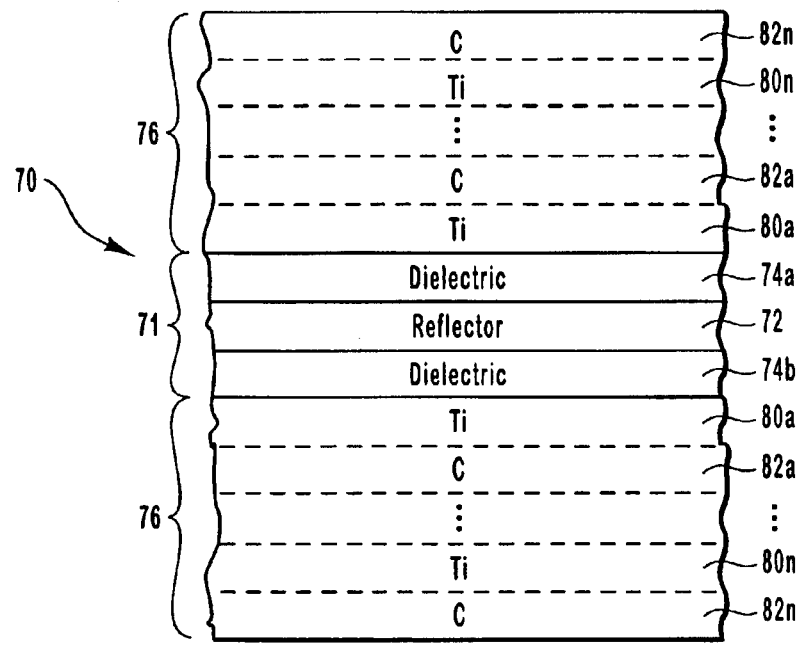
FIG. 8 is a schematic representation of the coating sequence in forming an absorber layer of a color shifting pigment flake according to one embodiment of the invention.

For example, FIG. 8 is a schematic representation of the coating sequence in forming a titanium-containing absorber layer of a color shifting pigment flake 70 according to one embodiment of the invention. The pigment flake 70 has a preflake structure 71, which includes a reflector layer 72 and dielectric layers 74a and 74b on opposing sides of reflector layer 72. A titanium-based absorber layer 76 is formed by depositing alternating sublayers 80a/82a through 80n/82n of titanium and carbon such as by a sputtering process in which preflake 71 is repeatedly moved passed a titanium target and a carbon target. This can be accomplished by use of the vibrating conveyer trays in a vacuum chamber as discussed previously. Each of the titanium and carbon sublayers can be deposited at atomic layer thicknesses, resulting in the sublayers having no discrete interfaces within absorber layer 76. The titanium and carbon sublayers thus form an intimate mixture at the atomic level of these two elements, effectively producing an amorphous absorber layer. For example, if the final thickness of the absorber layer is 150 Å, and the number of passes by a target is 440 (e.g., 110 minutes of coating time and 15 seconds to make the circular trip in the trays), then each sublayer is deposited at a thickness of about 0.3 Å (150/440). Alternatively, if each sublayer is deposited at greater than atomic layer thicknesses, then the titanium and carbon sublayers can have discrete interfaces with adjacent sublayers within absorber layer 76, or islands of titanium and carbon interspersed together can be formed, depending on the deposition rate utilized.

Similarly, a TiN absorber layer can be formed as an amorphous layer without crystalline structure. For example, a coating time of 110 minutes, with 15 seconds to make the circular trip in the trays, for a 250 g charge of one titanium target in the presence of $N_2$ gas to form TiN with the maximum chroma results in about 440 separate coating depositions onto the powdered flakes. This results in an amorphous layer absorber layer without crystalline structure.

Some flakes of the invention can be characterized as multilayer thin film interference structures in which layers lie in parallel planes such that the flakes have first and second parallel planar outer surfaces and an edge thickness perpendicular to the first and second parallel planar outer surfaces. Such flakes are produced to have an aspect ratio of at least about 2:1, and preferably about 5–15:1 with a narrow particle size distribution. The aspect ratio of the flakes is ascertained by taking the ratio of the longest planar dimension of the first and second outer surfaces to the edge thickness dimension of the flakes.

In order to impart additional durability to the color shifting flakes, an annealing process can be employed to heat treat the flakes at a temperature ranging from about 200–300° C., and preferably from about 250–275° C., for a time period ranging from about 10 minutes to about 24 hours, and preferably a time period of about 15–60 minutes.

The color shifting pigment flakes of the present invention can be interspersed within a pigment medium to produce a colorant composition which can be applied to a wide variety of objects or papers. The pigment flakes added to a medium produces a predetermined optical response through radiation incident on a surface of the solidified medium. Suitable pigment media include various polymeric compositions or organic binders such as acrylic melamine, urethanes, polyesters, vinyl resins, acrylates, methyl methacrylate, ABS resins, epoxies, styrenes, ink and paint formulations based on alkyd resins, and mixtures thereof. The color shifting flakes combined with the pigment media produce a colorant composition that can be used directly as a paint, ink, or moldable plastic material. The colorant composition can also be utilized as an additive to conventional paint, ink, or plastic materials.

In addition, the color shifting flakes can be optionally blended with various additive materials such as conventional pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint, ink, plastic or other polymeric pigment vehicle for use in a conventional manner.

Examples of suitable additive materials that can be combined with the color shifting flakes of the invention include non-color shifting high chroma or high reflective platelets which produce unique color effects, such as $MgF_2/Al/MgF_2$ platelets or $SiO_2/Al/SiO_2$ platelets. Other suitable additives that can be mixed with the color shifting flakes include lamellar pigments such as aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like; as well as various mixtures thereof. For example, pigments such as aluminum powder or carbon black can be added to control lightness and other color properties.

The color shifting flakes of the present invention are particularly suited for use in applications where colorants of high chroma and durability are desired. By using the color shifting flakes in a colorant composition, high chroma durable paint or ink can be produced in which variable color effects are noticeable to the human eye. The color shifting flakes of the invention have a wide range of color shifting properties, including large shifts in chroma (degree of color purity) and also large shifts in hue (relative color) with a varying angle of view. Thus, an object colored with a paint containing the color shifting flakes of the invention will change color depending upon variations in the viewing angle or the angle of the object relative to the viewing eye.

The color shifting flakes of the invention can be easily and economically utilized in paints and inks which can be applied to various objects or papers, such as motorized vehicles, currency and security documents, household appliances, architectural structures, flooring, fabrics, sporting goods, electronic packaging/housing, product packaging, etc. The color shifting flakes can also be utilized in forming colored plastic materials, coating compositions, extrusions, electrostatic coatings, glass, and ceramic materials. Because the titanium-based absorbers used in the pigment flakes are chemically and environmentally benign, the pigment flakes are particularly useful in products such as cosmetics, toys for children, and fashion apparel such as in leather goods and cloth goods that are constantly touched.

Generally, the color shifting foils of the invention have a nonsymmetrical thin film coating structure, which can correspond to the layer structures on one side of a reflector in any of the above described embodiments related to thin film stack flakes. For example, a foil can be formed with repeating dielectric/absorber periods on one side of a reflector layer such as shown for the flake in FIG. 5. The foils can be laminated to various objects or can be formed on a carrier substrate.

Figure 9:
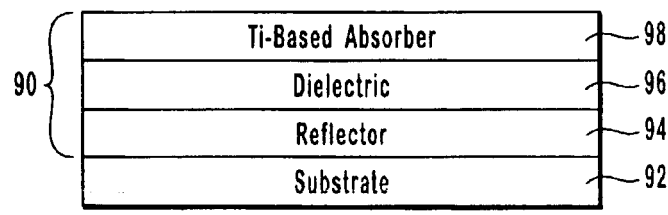
FIG. 9 is a schematic representation of the coating structure of a color shifting foil according to one embodiment of the invention.

FIG. 9 depicts a coating structure of a color shifting foil 90 formed on a substrate 92, which can be any suitable material such as a flexible PET web, carrier substrate, or other plastic material. A suitable thickness for substrate 92 is, for example, about 2 to 7 mils. The foil 90 includes a reflector layer 94 on substrate 92, a dielectric layer 96 on reflector layer 94, and a titanium-based absorber layer 98 on dielectric layer 96. The reflector, dielectric and absorber layers can be composed of the same materials and can have the same thicknesses as described above for the corresponding layers in flake 10.

The foil 90 can be formed by a web coating process, with the various layers as described above sequentially deposited on a web by conventional deposition techniques to form a thin film foil structure. The foil 90 can be formed on a release layer of a web so that the foil can be subsequently removed and attached to a surface of an object. The foil 90 can also be formed on a carrier substrate, which can be a web without a release layer.

Figure 10:
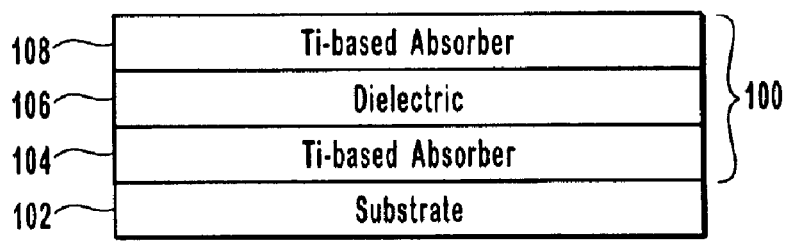
FIG. 10 is a schematic representation of the coating structure of a color shifting foil according to another embodiment of the invention.

FIG. 10 depicts a coating structure of a color shifting foil 100 formed on a carrier substrate 102. The foil 100 includes a first titanium-based absorber layer 104 on substrate 102, a dielectric layer 106 on absorber layer 104, and a second titanium-based absorber layer 108 on dielectric layer 106, but does not include a reflector layer. Such a film structure allows the foil to be transparent to light incident upon the surface thereof, thereby providing for visual verification or machine readability of information below foil 100 on carrier substrate 102. The dielectric and absorber layers of foil 100 can be composed of the same materials and can have the same thicknesses as described above for the corresponding layers in flake 10.

The foils of the invention can be used in a hot stamping configuration where the thin film stack of the foil is removed from the release layer of a substrate by use of a heat activated adhesive. The adhesive can be either coated on a surface of the foil opposite from the substrate, or can be applied in the form of a UV activated adhesive to the surface on which the foil will be affixed. Further details of making and using optical stacks as hot stamping foils can be found in U.S. Pat. Nos. 5,648,165, 5,002,312, 4,930,866, 4,838, 648, 4,779,898, and 4,705,300, the disclosures of which are incorporated by reference herein.

Figure 11:
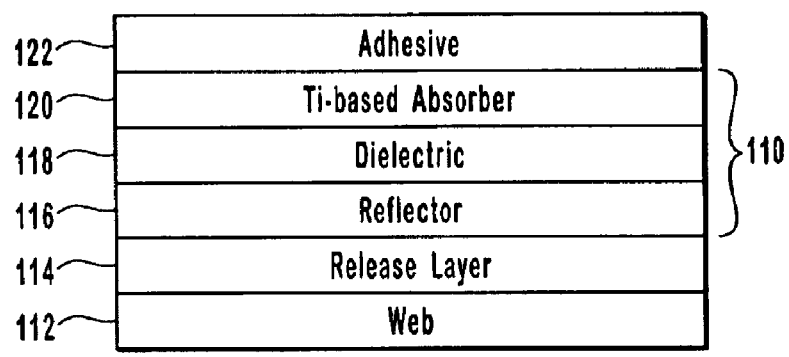
FIGS. 11 and 12 are alternative schematic configurations of the foil of FIG. 9 formed on a web.

FIG. 11 illustrates one embodiment of a foil 110 disposed on a web 112 having an optional release layer 114 on which is deposited reflector layer 116, dielectric layer 118, and titanium-based absorber layer 120. The foil 110 may be utilized attached to web 112 as a carrier when a release layer is not employed. Alternatively, foil 110 may be laminated to a transparent substrate (not shown) via an optional adhesive layer 122, such as a transparent adhesive or ultraviolet (UV) curable adhesive, when the release layer is used. The adhesive layer 122 is applied to absorber layer 120.

Figure 12:
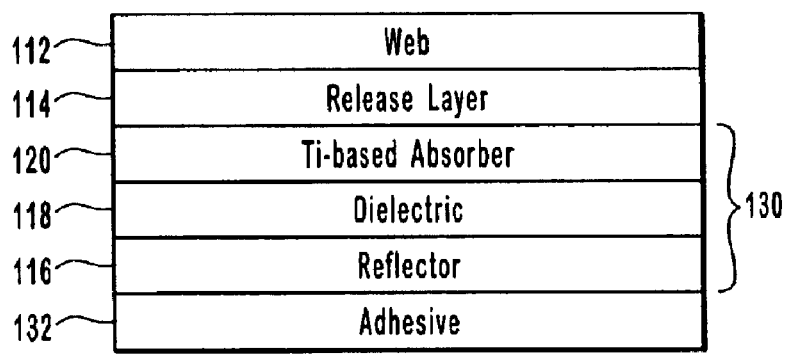

FIG. 12 depicts an alternative embodiment in which a foil 130 having the same thin film layers as foil 110 is disposed on a web 112 having optional release layer 114. The foil 130 is formed such that titanium-based absorber layer 120 is deposited on web 112. The foil 130 may be utilized attached to web 112 as a carrier, which is preferably transparent, when a release layer is not employed. The foil 130 may also be attached to a substrate (not shown) when the release layer is used, via an adhesive layer 132 such as a hot stampable adhesive, a pressure sensitive adhesive, a permanent adhesive, and the like. The adhesive layer 132 is applied to reflector layer 116.

The titanium-containing absorber layer in the pigment flakes of the invention provides the benefits of having benign chemical characteristics, as well as avoiding metal welding during the flake coating process. The titanium-based absorbers also avoid the auto-ignition problem of prior titanium coating techniques. In addition, as shown in the examples below, the pigments and foils of the present invention are durable toward water, acid, bleach and base. The pigments and foils are also stable to ultraviolet radiation (UV) exposure since none of the components used in preparing the pigments or foils are known to be UV sensitive.

The following examples are given to illustrate the present invention, and are not intended to limit the scope of the invention.

EXAMPLES

In order to quantify the color characteristics of a particular object, it is useful to invoke the L*a*b* color coordinate system developed by the Commission Internationale de l'Eclairage (CIE), which is now used as a standard in the industry in order to precisely describe color values. In this system, L* indicates lightness and a* and b* are the chromaticity coordinates. In some of the examples which follow, the color characteristics of a pigment are set forth in terms of L*, chroma (C*) which corresponds to color purity, and hue (h) which corresponds to color variation with changing angle.

The L*a*b* color system allows for a comparison of the color differences between two measurements through the parameter $\Delta E_{ab}$, which indicates the change in color as measured in the L*a*b* color space, such as the color difference of two different pigment designs. The numerical value for $\Delta E_{ab}$ is calculated through the following equation using the measured L*a*b* values:

$$\Delta E_{ab}=[(\Delta L^*)^2+(\Delta a^*)^2+(\Delta b^*)^2]^{1/2}$$

where the symbol $\Delta$ (or D used in some examples below) denotes the difference in measurements being compared.

Example 1

Figure 13:
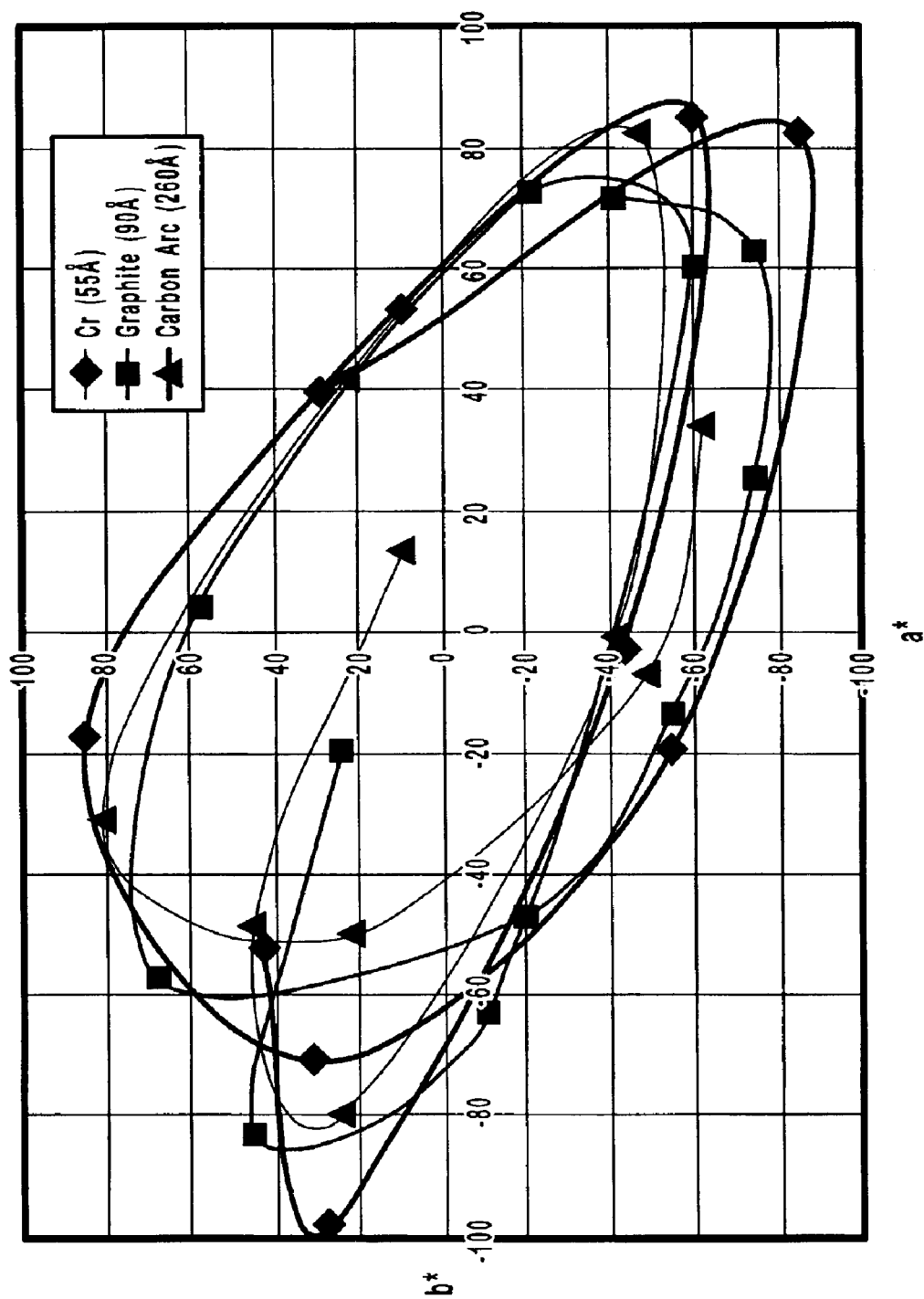
FIGS. 13 and 14 are graphs showing theoretical chromaticity plots based on theoretical modeling of multilayer thin film structures.
Figure 14:
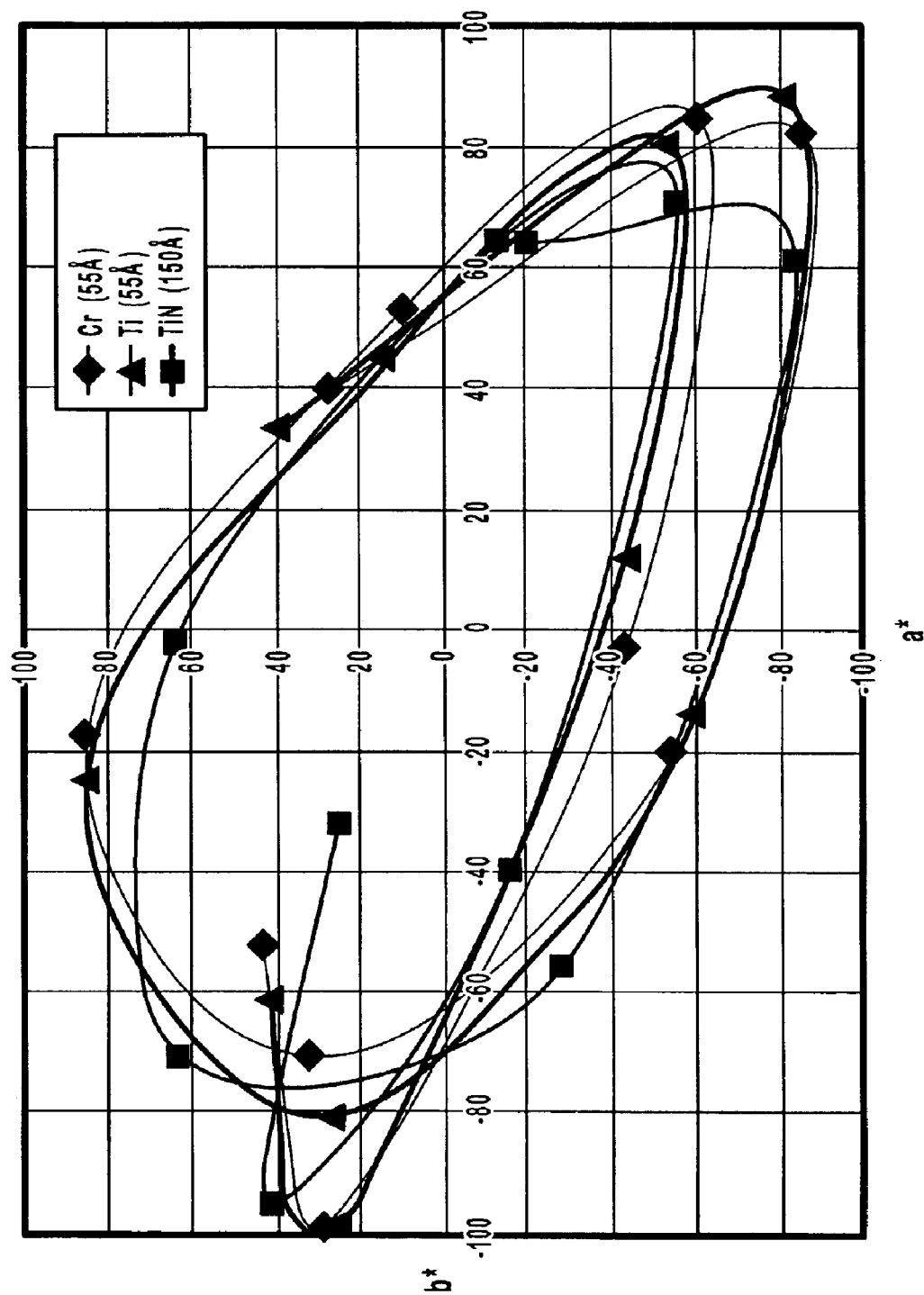

Theoretical modeling was performed using conventional optical design software to analyze thin film stacks having the following multilayer structure:

absorber/SiO$_2$(4 QW)/Al(800 Å)/SiO$_2$(4 QW)/absorber. The dielectric SiO$_2$ layer optical thickness varied from 4 quarter waves (QW) at 350 nm to 4 QW at 800 nm. FIGS. 13 and 14 are graphs showing theoretical chromaticity plots based on the theoretical modeling of this multilayer structure. In general, the graphs of FIGS. 13 and 14 show that based on theoretical modeling, this thin film stack structure with various absorber materials at varying thicknesses will produce a high chroma.

In particular, FIG. 13 shows the theoretical plots of a*, b*, where the chroma is defined as $C^*=\sqrt{(a^{*2}+b^{*2})}$, i.e., the chroma value is a vector starting from the origin. The further out from the origin, the larger the chroma value. FIG. 13 shows the plots for various absorbers, including 55 Å of Cr as an absorber, 90 Å of graphite as an absorber, and 260 Å of carbon from a carbon arc source as an absorber. All of the plot curves for each of these absorbers in FIG. 13 trace a similar but somewhat different trajectory. FIG. 14 shows the theoretical plots of a*, b* for various absorbers, including 55 Å of Cr as an absorber, 55 Å of Ti as an absorber, and 150 Å of TiN as an absorber. All of the plot curves for each of these absorbers trace a very similar trajectory. Thus, the chroma values for the films having absorber layers of Ti or TiN is similar to the chroma value for the film with chromium absorber layers.

Example 2

A color shifting powdered pigment according to the present invention was produced by coating a sol-gel based powder material with titanium nitride. The sol-gel material was composed of particles with the structure SiO$_2$/BMF/SiO$_2$, where the SiO$_2$ was formed from tetraethoxysilane (TEOS). The BMF material was formed on a release layer of a web in a roll coater as SiOx/Al/SiOx and removed by dissolving the release layer. Following removal of the BMF material from the web, the material was ground to about 30 $\mu$m. The BMF material was then reacted in a stirred reactor with IPA/water, ammonia and TEOS. The TEOS was reactively decomposed to form SiO$_2$ onto the surfaces of the SiOx. The thickness of the SiO$_2$ can be adjusted as desired to form the appropriate color shift. The sol-gel material was then dried and calcined at 500° C.

The sol-gel material in an amount of 240 grams was then loaded into a particle vacuum coater having vibrating trays which held the sol-gel particles. The particle vacuum chamber was pumped down to a pressure of 2×10$^{-5}$ torr. The vibrating trays were turned on prior to the pump-down so that entrapped air would not suddenly erupt and cause powder to stream out into the chamber. Nitrogen gas was then leaked into the chamber at a rate of 20 sccm and the chamber pressure was maintained at 2×10$^{-3}$ torr with the addition of argon. One titanium target was energized at 7 kW. The titanium reacted with the nitrogen gas forming titanium nitride on the surface of the sol-gel particles. An in-situ color monitor indicating the highest level of chroma on the moving particles was used to determine coating time, which was 110 minutes. Following coating, the chamber was allowed to cool under oxygen at a pressure of 2×10$^{-3}$ torr while the coated material was circulated in the trays. After the chamber temperature had declined to about 35° C. (after about 40 min), the chamber was slowly brought up to atmospheric pressure with atmospheric air. This process produced a color shifting powdered pigment (TiN pigment) exhibiting high chroma and good stability toward water, acid, base, bleach, and UV exposure.

An 8 mil film sample was prepared using the TiN pigment in a paint vehicle (Du Pont Refinish 150K) with an 8 pass wet film applicator (Doctor Blade device). One part pigment to 9 parts paint vehicle was used. The film sample exhibited a blue-to-red color shift at differing angles of incident light or viewing.

Table 1 below lists the color data generated for a standard black film and the above film sample having the TiN pigment, including the values measured for L*, a*, b*, C* and h, along with the change in each of these values ($\Delta$) between the standard black film and the film sample. The illuminant/observer conditions used in generating the data in Table 1 included a light source of $\Delta$65 10 deg (6500K black body light source at 10 degrees) for illuminating the films.

TABLE 1

| Color Value | Black | Film Sample | $\Delta$ |
| --- | --- | --- | --- |
| L* | 0.05 | 42.55 | 42.51 |
| a* | 0.09 | 23.49 | 23.40 |
| b* | -0.07 | -36.75 | -36.69 |
| C* | 0.11 | 43.62 | 43.51 |
| h | 322.99 | 302.59 | -0.78 |

The numerical value for $\Delta E_{ab}$ indicating the change in color was calculated from the L*a*b* values in Table 1 to be 60.83.

The TiN pigment was also drawn down into a pigment vehicle (Union Carbide VYHH Vinyl Resin, a vinyl chloride-vinyl acetate copolymer) to form a film in which the pigment to vehicle ratio by weight was 1:4.5. This film was characterized as to durability in water, acid, base, and bleach by measuring film samples on a DataColor spectrophotometer with D65 illumination (6500K black body light source) and 10 degrees observation. The film samples were measured after 24 hours of immersion in water at 140° F.; after 30 minutes of immersion in 2% by volume sulfuric acid (H$_2$SO$_4$); after 10 minutes of immersion in 2% by weight sodium hydroxide (NaOH); and after 10 minutes of immersion in 20% by volume Clorox bleach at room temperature. The change in color data measurements for these film samples with respect to the same measurements of the film sample prior to durability testing are summarized below in Table 2.

TABLE 2

| Test Sample | ΔL* | Δa* | Δb* | ΔC* | Δh | ΔE |
|---|---|---|---|---|---|---|
| 1 (Water) | −0.55 | −2.34 | 0.29 | −1.38 | −1.91 | 2.42 |
| 2 (Acid) | 0.26 | 0.12 | −0.76 | 0.72 | −0.27 | 0.81 |
| 3 (Base) | −0.39 | −1.75 | 1.71 | −2.34 | −0.72 | 2.48 |
| 4 (Bleach) | −0.14 | −0.74 | 0.17 | −0.51 | −0.57 | 0.78 |

The excellent durability for the four film samples listed in Table 2 is evident by the small changes, on average, in ΔE. Large changes in ΔE would be on the order of 20–30, whereas small changes are considered less than 10 and more preferably less than 5.

Example 3

A color shifting powdered pigment according to the present invention was produced by coating a sol-gel based powder material with titanium and carbon. The sol-gel material was composed of particles with the structure $SiO_2$/BMF/$SiO_2$, which were produced by the same procedure as described above for the sol-gel material in Example 1.

The sol-gel material in an amount of 380 grams was then loaded into a particle vacuum coater having vibrating trays which held the sol-gel particles. The particle vacuum chamber was pumped down to a pressure of $2 \times 10^{-5}$ torr. The vibrating trays were turned on prior to the pump-down so that entrapped air would not suddenly erupt and cause powder to stream out into the chamber. The chamber pressure was maintained at $2 \times 10^{-3}$ torr with the addition of argon. Two titanium targets were energized at 5 kW and one carbon target was powered at 6 kW. The sol-gel particles moved consecutively under the two titanium targets and then under the carbon target to form alternating sublayers of titanium and carbon on the particles. The coating time was 130 minutes.

Following coating, the chamber was allowed to cool under oxygen at a pressure of $2 \times 10^{-3}$ torr while the coated material was circulated in the trays. After the chamber temperature had declined, the chamber was slowly brought up to atmospheric pressure. The above process produced a color shifting powdered pigment (Ti—C pigment) exhibiting high chroma and good stability toward water, acid, base, bleach, and UV exposure.

An 8 mil film was prepared using the Ti—C pigment in the same paint vehicle and in the same manner as described above in Example 1, with one part pigment to 9 parts paint vehicle being used. The film exhibited a green-to-blue color shift at differing angles of incident light or viewing.

Table 3 below lists the color data generated for a standard black film and the above film sample having the Ti—C pigment, including the values measured for L*, a*, b*, C* and h, along with the change in each of these values (Δ) between the standard black film and the film sample. The illuminant/observer conditions used in generating the data in Table 3 included a light source of Δ65 10 deg for illuminating the films.

TABLE 3

| Color Value | Black | Film Sample | Δ |
|---|---|---|---|
| L* | 0.05 | 60.03 | 59.99 |
| a* | 0.09 | −42.95 | −43.04 |
| b* | −0.07 | −2.35 | −2.29 |

TABLE 3-continued

| Color Value | Black | Film Sample | Δ |
|---|---|---|---|
| C* | 0.11 | 43.02 | 42.91 |
| h | 322.99 | 183.14 | −4.10 |

The numerical value for $\Delta E_{ab}$ indicating the change in color was calculated from the L*a*b* values in Table 3 to be 73.87.

Example 4

A color shifting powdered pigment according to the present invention was produced by coating a sol-gel based powder material with titanium nitride. Each of the pigment flakes had the coating structure $TiN_x$/$SiO_2$(sol-gel)/Al (sputtered)/$SiO_2$(sol-gel)/$TiN_x$. The pigment was produced by a similar procedure as described above for the sol-gel material in Example 1. The pigment was drawn down into a pigment vehicle (Union Carbide VYHH Vinyl Resin) to form a film in which the pigment to vehicle ratio by weight was 1:5. This film was characterized as to durability in water, acid, base, and bleach by measuring film samples on a DataColor spectrophotometer with D65 illumination and 10 degrees observation. The film samples were measured after 24 hours of immersion in water at 140° F.; after 30 minutes of immersion in 2% by volume sulfuric acid ($H_2SO_4$); after 10 minutes of immersion in 2% by weight sodium hydroxide (NaOH); and after 10 minutes of immersion in 20% by volume Clorox bleach at room temperature. Color data measurements for these film samples are summarized below in Table 4, which shows excellent durability for the films.

TABLE 4

| Test Sample | ΔL* | Δa* | Δb* | ΔC* | ΔH* | ΔE* |
|---|---|---|---|---|---|---|
| 1 (Water) | −1.85 | −2.12 | 0.47 | −1.48 | −1.59 | 2.85 |
| 2 (Acid) | 0.45 | 0.25 | −0.51 | 0.57 | −0.06 | 0.73 |
| 3 (Base) | 0.16 | −1.34 | 1.39 | −1.88 | −0.43 | 1.94 |
| 4 (Bleach) | 0.53 | −1.05 | 0.77 | −1.20 | −0.50 | 1.40 |

Example 5

Color shifting films having a $TiN_x$ absorber layer were produced by direct microwave PECVD according to the following procedure. Glass substrates (1"×1") were pre-coated with an 80 nm thick aluminum layer, and an $SiO_2$ dielectric film having an optical thickness of 4 quarter waves (QW) at 550 nm. A plasma reactor, which can be described as a direct microwave PECVD device, was utilized to deposit the $TiN_x$ absorbing layer on the pre-coated substrates.

The pre-coated substrates (samples 1–15) were each separately placed on a substrate holder, which had a 100 mm diameter, at about 4 inches from a fused silica (dielectric) window placed between a symmetric plasma coupler and a reactor chamber. The titanium-containing gas, $TiCl_4$, was selected because it is inexpensive and a liquid at room temperature with a high vapor pressure. The $TiCl_4$ gas flow was adjusted with a vapor flow controller and was introduced in the vicinity of the substrate holder using a gas distributor. The other gases, Ar, $N_2$ and $H_2$, were introduced into the reactor chamber close to the window. The microwave power was fixed at 600 watts. The substrate temperature, flow of gases, total pressure, and deposition time were varied to obtain the best optical properties.

Table 5 below summarizes the process conditions for the deposition of the absorber layer on each of substrate samples 1–15 by direct microwave discharge.

TABLE 5

| Sample | TiCl$_4$ [sccm] | Ar [sccm] | H$_2$ [sccm] | N$_2$ [sccm] | Pressure [Torr] | Temp. [° C.] | Time |
|---|---|---|---|---|---|---|---|
| 1 | 6 | 25 | 70 | 15 | 100 | 200 | 3 min |
| 2 | 6 | 25 | 70 | 15 | 100 | 200 | 5 min |
| 3 | 6 | 25 | 70 | 15 | 100 | 200 | 2 min |
| 4 | 6 | 25 | 70 | 15 | 100 | 300 | 2 min |
| 5 | 6 | 25 | 70 | 15 | 80 | 200 | 2 min |
| 6 | 6 | 25 | 70 | 20 | 80 | 200 | 1 min 45 sec |
| 7 | 6 | 25 | 70 | 15 | 100 | 200 | 4 min |
| 8 | 6 | 25 | 70 | 15 | 100 | 200 | 2 min 30 sec |
| 9 | 6 | 25 | 70 | 15 | 100 | 200 | 1 min 45 sec |
| 10 | 6 | 25 | 70 | 15 | 100 | 200 | 1 min 10 sec |
| 11 | 6 | 25 | 70 | 15 | 100 | 200 | 45 sec |
| 12 | 6 | 25 | 70 | 15 | 100 | 300 | 45 sec |
| 13 | 6 | 25 | 70 | 15 | 100 | Room | 1 min |
| 14 | 6 | 25 | 70 | 15 | 100 | 350 | 1 min 05 sec |
| 15 | 6 | 25 | 70 | 15 | 100 | 400 | 1 min |

Table 6 below gives the color data measurements for the best optical performance obtained among samples 1–15.

TABLE 6

| Sample | L* | C* | H |
|---|---|---|---|
| 9 | 48.61 | 40.33 | 348.17 |
| 14 | 77.38 | 40.19 | 104.79 |

Differing process conditions and absorber layer thicknesses can change the final color and color shifting of the film design. For example, sample 9 produced a red-to-green color shift while sample 14 produced a green-to-blue color shift, even though the original pre-coated substrates had the same optical design.

Figure 15:
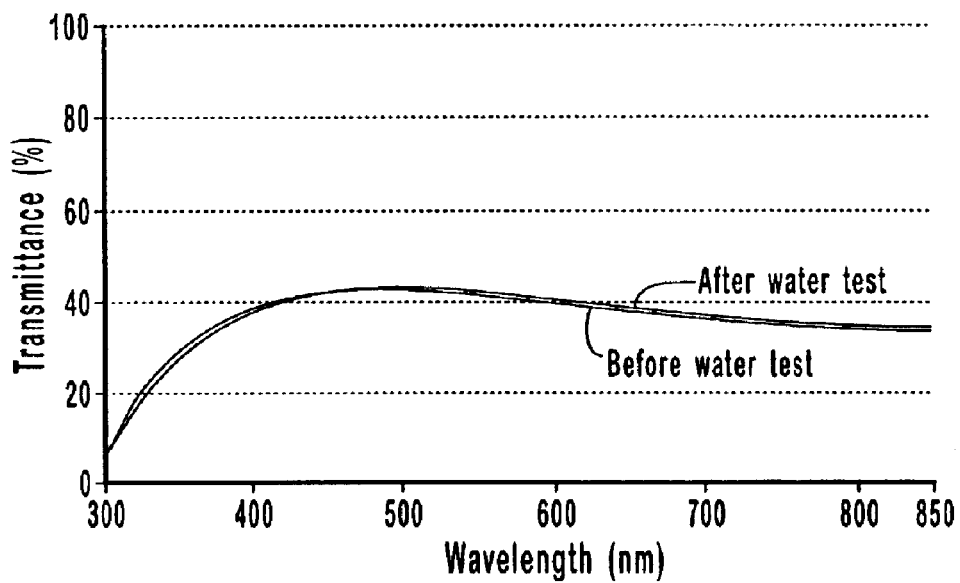
FIG. 15 is a graph showing transmittance as a function of wavelength for an absorber layer of a color shifting film both before and after extended water exposure.

FIG. 15 is a graph showing the transmittance of the absorber layer as a function of wavelength for the color shifting film corresponding to sample 14 before and after being placed in water at 60° C. for 24 hours. This graph shows that for some conditions, the absorber layers are very stable against oxidation.

It should be noted that similar results can be obtained if the plasma coupler and the fused silica window are located over vibrating trays where flakes with an equivalent optical design (SiO$_2$(4QW)/Al(80 nm)/SiO$_2$(4QW)) are flowing such as described previously.

Example 6

Color shifting films having TiN, TiC, or TiN$_x$C$_z$ absorber layers were produced by RF PECVD according to the following procedure. Glass substrates such as those described in Example 3 were pre-coated with an 80 nm thick aluminum layer, and an SiO$_2$ dielectric film having an optical thickness of 4 quarter waves (QW) at 550 nm. A plasma reactor, which can be described as an RF powered downstream (Ds) PECVD device, was utilized to deposit the TiN, TiC, or TiN$_x$C$_z$ absorbing layers on the pre-coated substrates.

The pre-coated substrates (samples 16–30) were each separately placed on a substrate holder, which had a 100 mm diameter, at about 4 inches from the end of a dielectric chamber. The process gases Ar, N$_2$, NH$_3$, CH$_4$ and H$_2$ were introduced into the plasma zone in the dielectric chamber, and the TiCl$_4$ gas was introduced in the vicinity of the substrate holder using a gas distributor. The pressure was fixed at 100 mTorr. The substrate temperature, flow of gases, RF power, and deposition time were varied to obtain the best optical properties.

Table 7 below summarizes the process conditions for the deposition of the absorber layer on each of substrate samples 16–30 by RF downstream plasma.

TABLE 7

| Sample | TiCl$_4$ [sccm] | Ar [sccm] | H$_2$ [sccm] | N$_2$ [sccm] | Rf power [W] | Temp. [° C.] | Time [sec] |
|---|---|---|---|---|---|---|---|
| 16 (TiN) | 5 | 25 | 90 | 35 | 100 | 400 | 60 |
| 17 (TiN) | 5 | 25 | 90 | 35 | 150 | 400 | 50 |
| 18 (TiN) | 5 | 25 | 90 | 35 | 400 | 25 | 60 |
| 19 (TiN) | 5 | 25 | 90 | 35 | 300 | 400 | 60 |
| 20 (TiN) | 5 | 25 | 90 | 35 | 300 | 300 | 60 |
| 21 (TiN) | 5 | 25 | 90 | 35 | 300 | 200 | 135 |

| Sample | TiCl$_4$ [sccm] | Ar [sccm] | H$_2$ [sccm] | CH$_4$ [sccm] | Rf power [W] | Temp. [° C.] | Time [sec] |
|---|---|---|---|---|---|---|---|
| 22 (TiC) | 5 | 25 | 90 | 35 | 300 | 200 | 135 |
| 23 (TiC) | 5 | 25 | 25 | 10 | 300 | 200 | 120 |
| 24 (TiC) | 6 | 25 | 25 | 25 | 300 | 400 | 210 |

| Sample | TiCl$_4$ [sccm] | Ar [sccm] | N$_2$ [sccm] | CH$_4$ [sccm] | Rf power [W] | Temp. [° C.] | Time [sec] |
|---|---|---|---|---|---|---|---|
| 25 (TiCN) | 6 | 25 | 35 | 25 | 300 | 300 | 195 |
| 26 (TiCN) | 6 | 25 | 35 | 25 | 300 | 300 | 60 |
| 27 (TiCN) | 6 | 25 | 35 | 25 | 300 | 200 | 75 |

| Sample | TiCl$_4$ [sccm] | Ar [sccm] | N$_2$ [sccm] | NH$_3$ [sccm] | Rf power [W] | Temp. [° C.] | Time [sec] |
|---|---|---|---|---|---|---|---|

TABLE 7-continued

| | | | | | | | |
|---|---|---|---|---|---|---|---|
| 28 (TiN) | 6 | 25 | No | 80 | 300 | 200 | 125 |
| 29 (TiN) | 6 | 50 | No | 60 | 300 | 200 | 180 |
| 30 (TiN) | 6 | 25 | No | 100 | 300 | 200 | 240 |

Table 8 below lists the color data measurements for the best optical performance obtained among samples 16–30, and for a comparative sample which had a chromium absorber layer evaporated onto the same type of pre-coated substrate as used in samples 16–30.

TABLE 8

| Sample | L* | C* | H |
|---|---|---|---|
| Cr (Evap.) | 80.41 | 69.12 | 137.92 |
| 17 | 78.68 | 82.98 | 143.63 |
| 18 | 77.56 | 81.44 | 144.66 |
| 16 | 79.79 | 78.22 | 133.26 |
| 19 | 80.04 | 77.46 | 136.35 |
| 21 | 83.68 | 68.6 | 131.28 |
| 20 | 88.96 | 36.47 | 144.16 |

Figure 16:
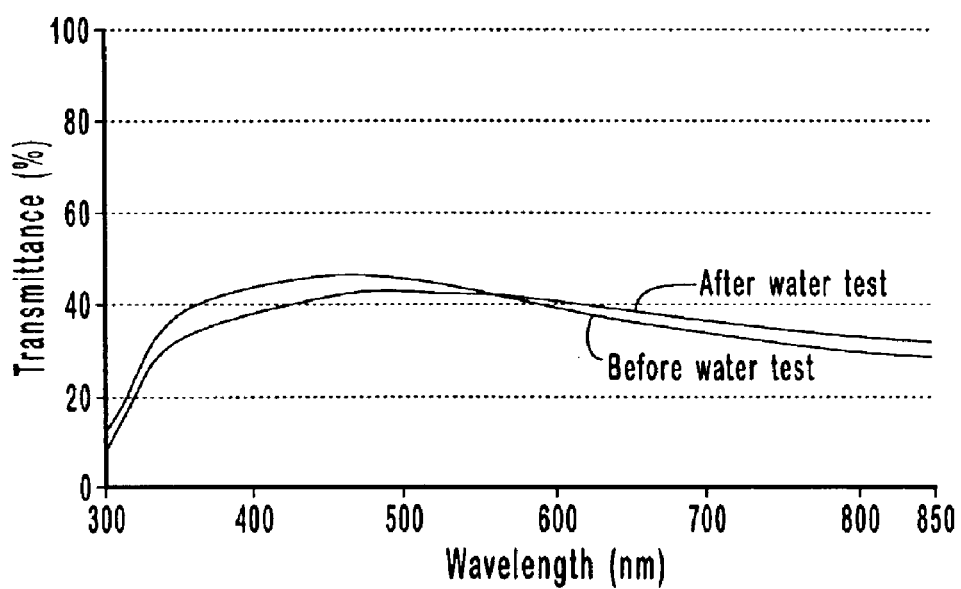
FIG. 16 is a graph showing transmittance as a function of wavelength for an absorber layer of a color shifting film both before and after extended water exposure.

As shown in Table 8, some process conditions produced films (samples 16–19) with higher chromas than that of the sample with the chromium absorber layer. FIG. 16 is a graph showing the transmittance of the absorber layer for the color shifting film corresponding to sample 17 both before and after being placed in water at 60° C. for 24 hours. The graph of FIG. 16 shows that this layer had good stability against oxidation. The film of sample 17 produced a green-to-blue color shift.

It should be noted that similar results can be obtained if an RF plasma source is located over vibrating trays where flakes with an equivalent optical design ($SiO_2$(4QW)/Al(80 nm)/$SiO_2$(4QW)) are flowing such as described previously.

Example 7

A color shifting film having a Ti absorber layer was formed on a hardcoated polyethylene terephthalate (PET) web (Avery Hardcoated PET) with the following coating design:

Ti(150 Å)/$MgF_2$(4QW at 700 nm)/Al(850 Å)/$MgF_2$(4QW at 700 nm)/Ti(150 Å).

Figure 17:
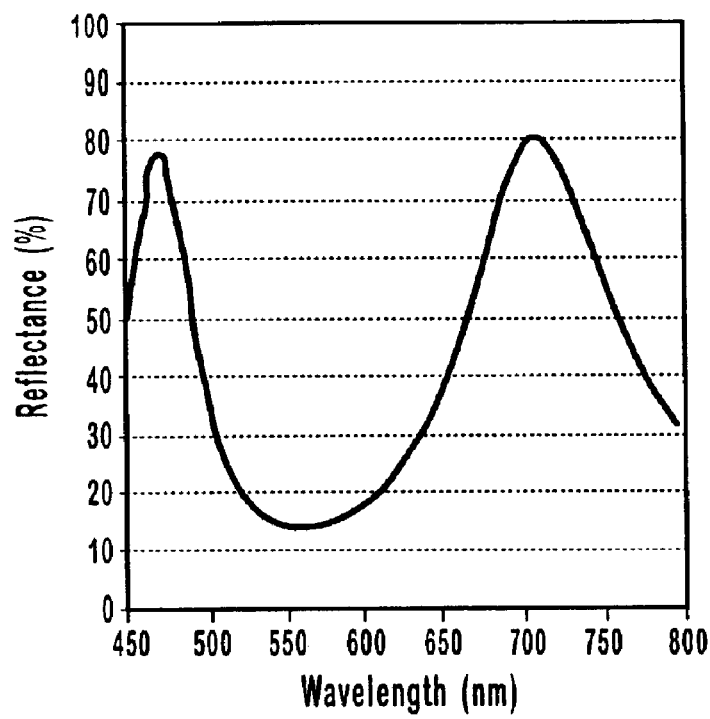
FIGS. 17 and 18 are graphs showing reflectance as a function of wavelength for the front and back sides of a color shifting film of the invention.
Figure 18:
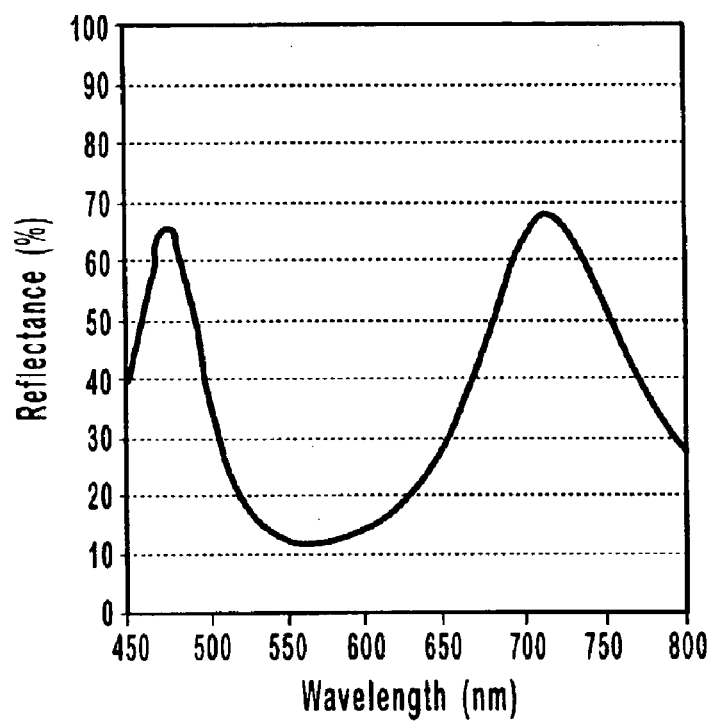

FIG. 17 is a graph showing reflectance as a function of wavelength for the front side of this foil film. FIG. 18 is a graph showing reflectance as a function of wavelength for the back side of this foil film. These graphs show that the Ti absorber in the film provides good absorption from about 550 nm to about 600 nm in the visible spectrum. It should be noted that both sides of the film have essentially the same optical properties as is required for high chroma pigments based on the technologies disclosed herein.

Example 8

A color shifting foil having a Ti absorber layer was formed on a hardcoated PET web Avery Hardcoated PET). The foil had the coating structure:

Ti(100 Å)/$MgF_2$(4QW at 632 nm)/Al(opaque)/$MgF_2$ (4QW at 632 nm)/Ti(100 Å).

Table 9 below lists the color data generated for various samples of the foil, including the X, Y, Z tristimulus values and the values measured for L*, a*, b*, C*, and h, as well as the iluminant/observer conditions used in generating the data in Table 9. The data was generated using a Zeiss gonoiospectrophotometer, with a light source of Δ65 at 10 degrees observation used to illuminate the samples. The illumination angle was from 180°, the observer angle (view) was from 0°, and the angle between illumination and observer (Diff.) was 10°.

TABLE 9

| Sample | Illum. angle | View | Diff. | Filter | X | Y | Z | L* | a* | b* | C* | h |
|---|---|---|---|---|---|---|---|---|---|---|---|---|
| 1 | 25 | 145 | 10 | 1 | 65.06 | 60.59 | 238.22 | 82.16 | 17.92 | −91.64 | 93.37 | 281.07 |
| 2 | 30 | 140 | 10 | 1 | 52.86 | 60.98 | 196.55 | 82.37 | −12.48 | −75.08 | 76.11 | 260.56 |
| 3 | 35 | 135 | 10 | 1 | 45.26 | 65.50 | 149.51 | 84.74 | −43.45 | −49.67 | 65.99 | 228.82 |
| 4 | 40 | 130 | 10 | 1 | 40.89 | 69.68 | 103.81 | 86.84 | −65.53 | −20.47 | 68.65 | 197.35 |
| 5 | 45 | 125 | 10 | 1 | 40.02 | 72.88 | 67.39 | 88.39 | −74.90 | 8.73 | 75.40 | 173.35 |
| 6 | 50 | 120 | 10 | 1 | 40.79 | 73.36 | 41.52 | 88.62 | −73.50 | 34.66 | 81.26 | 154.76 |
| 7 | 55 | 115 | 10 | 1 | 42.72 | 72.44 | 25.64 | 88.18 | −65.75 | 55.53 | 86.06 | 139.82 |
| 8 | 60 | 110 | 10 | 1 | 44.50 | 70.09 | 16.58 | 87.04 | −55.56 | 70.35 | 89.64 | 128.30 |
| 9 | 65 | 105 | 10 | 1 | 45.91 | 67.14 | 11.87 | 85.57 | −45.18 | 79.12 | 91.11 | 119.73 |
| 10 | 70 | 100 | 10 | 1 | 47.03 | 64.64 | 10.04 | 84.30 | −36.52 | 82.13 | 89.88 | 113.97 |
| 11 | 75 | 95 | 10 | 1 | 47.59 | 62.37 | 9.41 | 83.11 | −29.83 | 82.03 | 87.28 | 109.98 |

FIGS. 19A and 19B make up an L*a*b* diagram which plots the color trajectory and chromaticity of the foil of example 8 at the eleven (11) different angles of viewing shown in Table 9 under specular conditions. It can be seen in referring to FIGS. 19A and 19B that the color at normal viewing condition is yellow. As the angle of viewing becomes larger relative to 90° to the plane of the sample, the color changes from yellow-to-green-to-blue.

Example 9

Color shifting pigments were produced in which the pigment flakes had following coating structures:
Sample 1) Ti/$MgF_2$(4QW at 550 nm)/Al/$MgF_2$ (4QW at 550 nm)/Ti; and
Sample 2) Cr/$MgF_2$(6QW at 550 nm)/Al/$MgF_2$ (6QW at 550 nm)/Cr.

Figure 20:
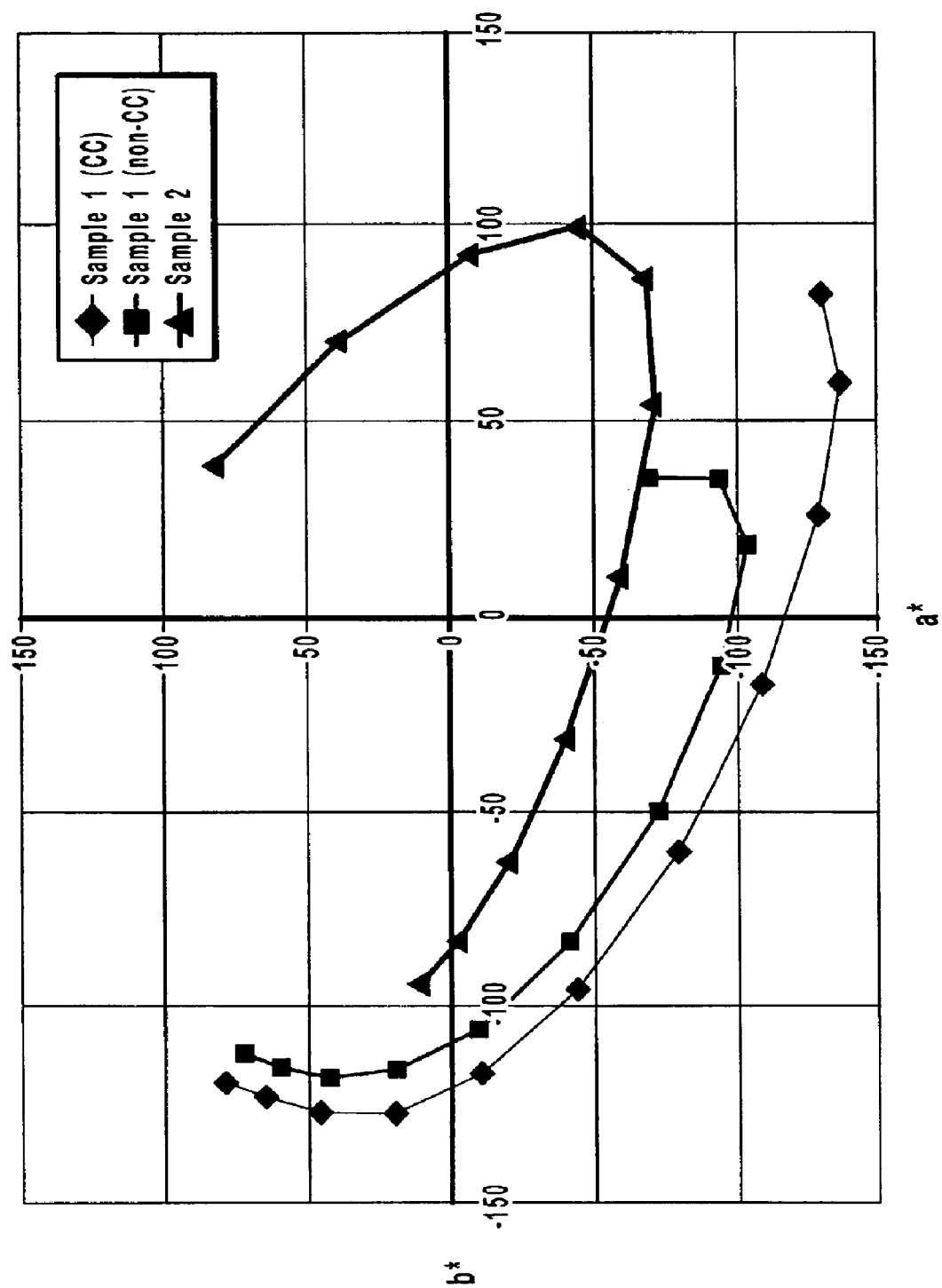
FIG. 20 is a chromaticity graph showing the measured color trajectories for various panels painted with alternate color shifting pigments.

The pigments were drawn down into a pigment vehicle to form painted panels. FIG. 20 is a chromaticity graph showing the measured color trajectories for the painted panels. The color trajectories shown in the graph of FIG. 20 were generated using a Zeiss gonoiospectrophotometer. The graph of FIG. 20 shows the color trajectory for a painted panel having the sample 1 pigment, which had a green-toblue color shift, and the color trajectory for a painted panel having the sample 1 pigment overcoated with a clear coat (cc) on the painted panel. The graph of FIG. 20 also shows the color trajectory for a painted panel having the sample 2 pigment, which had a green-to-purple color shift. The graph of FIG. 20 shows that high chroma that can be achieved when Ti is used as an absorber layer (sample 1), especially in pigment form, with the sample 1 pigment producing a greater chroma than the sample 2 (conventional) pigment having a Cr absorber.

Example 10

Various color shifting pigments with titanium, carbon, or chromium absorbers were produced by depositing multilayer thin films on a web by electron beam, removing the films from the web in the form of flakes, and grinding the flakes to form the final pigment. The pigment flakes had following coating structure: absorber/MgF$_2$/Al/MgF$_2$/absorber.

Various pigment samples were drawn down into a pigment vehicle to form films which were characterized as to durability in water, acid, base, and bleach. The change in color data measurements ($\Delta E$) for these film samples with respect to the same measurements of the film sample prior to durability testing are summarized below in Table 10. The data in Table 10 compares the effect of absorber material type on durability with everything else being equal.

TABLE 10

| Sample | Absorber | Chroma | Hue | ΔE acid | ΔE base | ΔE bleach | ΔE water |
|---|---|---|---|---|---|---|---|
| 1, 2 | C | 39.09 | 125.82 | 0.81 | 2.34 | 2.68 | 1.00 |
| 3, 4 | C | 34.09 | 72.68 | 0.18 | 3.74 | 1.73 | 0.19 |
| 5 | C | 38.32 | 169.79 | 0.38 | 1.98 | 0.84 | 4.31 |
| 6, 7 | Cr | 33.56 | 39.09 | 0.41 | 13.79 | 5.36 | 7.16 |
| 8, 9, 10 | Cr | 57.87 | 120.62 | 0.52 | 6.27 | 8.15 | 1.20 |
| 11, 12 | Cr | 59.12 | 124.23 | 0.49 | 3.05 | 2.99 | 1.81 |
| 13, 14 | Cr | 55.06 | 97.89 | 0.47 | 15.96 | 8.91 | 5.23 |
| 15, 16 | Ti | 27.89 | 348.30 | 3.16 | 14.43 | 0.95 | 5.92 |
| 17, 18, 19 | Ti | 53.02 | 137.33 | 1.42 | 5.13 | 6.19 | 2.84 |
| 20, 21 | Ti | 42.93 | 125.16 | 1.50 | 3.99 | 4.73 | 3.42 |
| 22, 23 | Ti | 36.23 | 97.79 | 0.73 | 13.24 | 3.13 | 3.84 |
| 24, 25 | Ti | 39.88 | 106.87 | 0.84 | 4.00 | 5.58 | 3.69 |

Example 11

Various color shifting pigments with titanium absorbers at differing thicknesses were produced by depositing multilayer thin films on a hardcoated web, removing the films from the web in the form of flakes, and grinding the flakes to form the final pigment. The pigment flakes for each of the various pigments had the following coating structures:

1) Ti(50 Å)/MgF$_2$(4QW at 632 nm)/Al(1000 Å)/MgF$_2$ (4QW at 632 nm)/Ti(50 Å);
2) Ti(75 Å)/MgF$_2$(4QW at 632 nm)/Al(1000 Å)/MgF$_2$ (4QW at 632 nm)/Ti(75 Å);
3) Ti(100 Å)/MgF$_2$(4QW at 632 nm)/Al(1000 Å)/MgF$_2$ (4QW at 632 nm)/Ti(100 Å);
4) Ti(125 Å)/MgF$_2$(4QW at 632 nm)/Al(1000 Å)/MgF$_2$ (4QW at 632 nm)/Ti(125 Å);
5) Ti(150 Å)/MgF$_2$(4QW at 632 nm)/Al(1000 Å)/MgF$_2$ (4QW at 632 nm)/Ti(150 Å).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A color shifting foil, comprising:

a reflector layer;

a dielectric layer on the reflector layer; and a selectively absorbing absorber layer on the dielectric layer, said absorber layer comprising a selectively absorbing titanium-based compound;

said foil exhibiting a discrete color shift such that the foil has a first color at a first angle of incident light or viewing and a second color different from the first color at a second angle of incident light or viewing.

2. The foil of claim 1, further comprising a web carrier with either the reflector layer or the absorber layer deposited on the web carrier.

3. The foil of claim 2, wherein the web carrier further comprises a release layer thereon disposed between the web carrier and the reflector layer, or the web carrier and the absorber layer.

4. The foil of claim 3, further comprising an adhesive layer for laminating the foil to a substrate.

5. The foil of claim 4, wherein the adhesive layer is selected from the group consisting of a hot stampable adhesive, a pressure sensitive adhesive, a permanent adhesive, a transparent adhesive, and a UV curable adhesive.

6. The foil of claim 4, wherein the adhesive layer is on the reflector layer or the absorber layer.

7. The foil of claim 1, wherein the reflector layer comprises a reflective material selected from the group consisting of aluminum, silver, copper, gold, platinum, tin, titanium, palladium, nickel, cobalt, rhodium, niobium, chromium, and combinations or alloys thereof.

8. The foil of claim 1, wherein the dielectric layer comprises a dielectric material having an index of refraction of about 1.65 or less.

9. The foil of claim 8, wherein the dielectric material is selected from the group consisting of silicon dioxide, aluminum oxide, magnesium fluoride, aluminum fluoride, cerium fluoride, lanthanum fluoride, neodymium fluoride, samarium fluoride, barium fluoride, calcium fluoride, lithium fluoride, and combinations thereof.

10. The foil of claim 1, wherein the dielectric layer comprises a dielectric material having an index of refraction of greater than about 1.65.

11. The foil of claim 10, wherein the dielectric material is selected from the group consisting of zinc sulfide, zinc oxide, zirconium oxide, titanium dioxide, carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

12. The foil of claim 1, wherein the dielectric layer is composed of a dielectric optical stack having a plurality of alternating layers of a high index material and a low index material.

13. The foil of claim 12, wherein the dielectric optical stack has a gradient index of refraction.

14. The foil of claim 1, wherein the absorber layer comprises an absorbing material selected from the group consisting of titanium nitride, titanium oxynitride, titanium carbide, titanium oxynitride carbide, titanium silicide, titanium boride, and combinations thereof.

15. A color shifting foil, comprising:
a reflector layer;
a dielectric layer on the reflector layer; and
a titanium nitride absorber layer on the dielectric layer;
said foil exhibiting a discrete color shift such that the foil has a first color at a first angle of incident light or viewing and a second color different from the first color at a second angle of incident light or viewing.

16. A color shifting foil, comprising:
a reflector layer;
a dielectric layer on the reflector layer; and
an absorber layer on the dielectric layer, said absorber layer comprising a material selected from the group consisting of titanium nitride, titanium oxynitride, titanium carbide, titanium oxynitride carbide, titanium silicide, titanium boride, and combinations thereof;
said foil exhibiting a discrete color shift such that the foil has a first color at a first angle of incident light or viewing and a second color different from the first color at a second angle of incident light or viewing.

* * * * *